United States Patent
Molinazzi et al.

(10) Patent No.: US 10,866,151 B2
(45) Date of Patent: Dec. 15, 2020

(54) HIGH RESISTANCE STRAIN GAUGES AND METHODS OF PRODUCTION THEREOF

(71) Applicant: EZMEMS LTD., Netanya (IL)

(72) Inventors: Nicola Molinazzi, Kfar Sava (IL); Tsvi Shmilovich, Pardes Hanna-Karkur (IL)

(73) Assignee: EZMEMS LTD., Netanya (IL)

( * ) Notice: Subject to any disclaimer, the term of this patent is extended or adjusted under 35 U.S.C. 154(b) by 0 days.

(21) Appl. No.: 16/461,848

(22) PCT Filed: Nov. 16, 2017

(86) PCT No.: PCT/IL2017/051243
§ 371 (c)(1),
(2) Date: May 17, 2019

(87) PCT Pub. No.: WO2018/092130
PCT Pub. Date: May 24, 2018

(65) Prior Publication Data
US 2019/0368953 A1    Dec. 5, 2019

Related U.S. Application Data

(60) Provisional application No. 62/423,219, filed on Nov. 17, 2016.

(51) Int. Cl.
*G01L 1/00* (2006.01)
*G01L 1/22* (2006.01)
*G01B 7/16* (2006.01)
*G01B 7/00* (2006.01)

(52) U.S. Cl.
CPC .............. *G01L 1/2287* (2013.01); *G01B 7/18* (2013.01); *G01L 1/2281* (2013.01)

(58) Field of Classification Search
CPC ........ G01L 1/2287; G01L 1/2281; G01B 7/18
USPC ........................................................... 73/774
See application file for complete search history.

(56) References Cited

U.S. PATENT DOCUMENTS

| 2,885,524 | A | * | 5/1959 | Eisler | ................... G01L 1/2287 |
|---|---|---|---|---|---|
| | | | | | 29/611 |
| 3,005,170 | A | | 10/1961 | Starr | |
| 3,498,118 | A | | 3/1970 | Ruge | |
| 4,322,707 | A | | 3/1982 | Ort | |

(Continued)

FOREIGN PATENT DOCUMENTS

| JP | H4-258728 A | 9/1992 |
|---|---|---|
| WO | 2011/163442 A1 | 12/2011 |
| WO | 2015/114635 A1 | 8/2015 |

*Primary Examiner* — Max H Noori
*Assistant Examiner* — Masoud H Noori
(74) *Attorney, Agent, or Firm* — Browdy and Neimark, P.L.L.C.

(57) ABSTRACT

Strain gauge structures having high and accurately adjustable electrical resistances and improved heat dispersion properties include a substrate, at least one transducing element configured to change at least one electrical property thereof in response to deformations in the substrate, and one or more trimming grids electrically connected to the at least one transducing element and configured and operable to accurately set electrical resistance of the strain gauge element by setting length of a conduction path thereof, and at least one heat sink element thermally coupled to at least one of the at least one transducing element and the one or more trimming grids and configured to dissipate heat developed therein.

22 Claims, 12 Drawing Sheets

(56) References Cited

U.S. PATENT DOCUMENTS

| | | | |
|---|---|---|---|
| 4,325,048 A | 4/1982 | Zaghi et al. | |
| 4,400,869 A * | 8/1983 | Wilner | G01L 9/0042 |
| | | | 257/419 |
| 5,227,760 A | 7/1993 | Kobayashi | |
| 6,700,174 B1 | 3/2004 | Miu et al. | |
| 2006/0288794 A1* | 12/2006 | Hardwicke | G01L 1/2287 |
| | | | 73/763 |
| 2010/0131211 A1* | 5/2010 | Shipley | G01N 19/04 |
| | | | 702/43 |
| 2015/0338294 A1* | 11/2015 | Watson | G01L 1/2287 |
| | | | 73/774 |
| 2017/0226355 A1* | 8/2017 | Torfs | C09D 11/107 |

* cited by examiner

HIGH RESISTANCE STRAIN GAUGES AND METHODS OF PRODUCTION THEREOF

TECHNOLOGICAL FIELD

The present invention is generally in the field of strain gauges.

BACKGROUND

Strain gauge elements typically use an electrically insulating flexible support sheet as a substrate on which an electrical transducer metallic thin layer/foil is patterned/deposited. In use, the support sheet of the strain gauge is typically attached directly onto a deformable surface (e.g., metal bars, membranes, pipes, tubing, etc.) by a suitable adhesive, or alternatively the strain gauge can be directly formed on the deformable surface (e.g., membrane or thin layers of a fluidic microelectronic device, aka MEM device), by suitable metal deposition techniques. In this way, deformations of the deformable surface correspondingly deform the transducing thin layer, which thereby respectively change electrical properties, such as the electrical resistance, of the thin layer. The electrical resistance change of the thin layer is related to the strain by the quantity known as the gauge factor.

A Wheatstone bridge diamond-like structure, having four resistive edges, is typically used to implement a sensing device usable for reading the electrical resistance changes of such strain gauge elements. In these measurements, an excitation voltage is applied to input terminals of the sensing device electrically connected to a pair of opposite vertices of the diamond-like structure of the bridge, and a voltage reading is taken from the output terminals electrically connected to the other pair of opposite vertices of the bridge structure (differential voltage).

The resistive edges of the Wheatstone bridge are often implemented by four substantially identical strain gauges. For example, in the quarter bridge configuration three of the identical strain gauges are placed on non-deformable surface(s), to present a substantially fixed electric resistance, and only the fourth identical strain gauge is placed on a deformable surface. But other bridge configurations are also possible, such as the half bridge configuration, wherein two strain gauges are placed on the deformable surface, or the full bridge configuration, wherein all strain gauges are placed on the deformable surface. In a calibrated Wheatstone bridge circuit all four resistive edges have the same resistance value (when no strain is applied), such that the voltage obtained over each resistive edge is half of the applied excitation voltage, and the differential voltage outputted by the bridge is substantially zeroed. Accordingly, the excitation voltage of the bridge and the excitation voltages over the strain gauges are related.

A common problem with such bridge measurement setups is to obtain the recommended value of bridge excitation voltage for a particular size and type of strain gauge element. The problem is particularly difficult when the maximum excitation voltage level is desired to maximize the output signal (the output voltage of the bridge setup is proportional to the excitation voltage over its input terminals).

The voltage applied to a strain gauge bridge setup creates a power loss in each arm/resistive edge of the bridge, all of which must be dissipated in the form of heat. This causes the sensing grid (transducer) of every strain gauge to operate at a temperature higher than the deformable support to which it is bonded, or on which it was deposited/patterned. For example, in fluidic micro electromechanical (MEM) devices the heat generated by the resistive elements of a strain gauge bridge setup is typically transferred by conduction through the deformable surface/membrane of the MEM device to the specimen (e.g., fluidic and/or gaseous substances) introduced into the device, which in effect causes a temperature rise in the substrate of the MEM device.

The temperature rise of the substrate of the MEM device is a function of its heat-sink capacity and of the power that needs to be dissipated by the strain gauge element. The performance of the strain gauge element will be affected by excessive temperature rise, due to the following phenomena:

Loss of self-temperature-compensation (STC) typically occurs when the temperature of the transducer(s) is considerably greater than the temperature of the specimen.

Hysteresis and creep effects are magnified.

Zero (no-load) stability is strongly affected by excessive excitation.

Any tendency for localized areas of the transducer(s) to operate at higher temperatures than the rest of the sensing device restricts the allowable excitation voltage levels that can be used therewith.

Creep and instability are particularly susceptible to these "hot-spot" effects, which are usually due to voids or bubbles in the glue line or discontinuities in the substrate. Imperfections in the gauge element itself can cause the development of hot spots, and thus only high quality gauges are suitable for high-excitation applications.

The power-dissipation capability of a strain gauge element varies approximately with the area of the transducer element (active gauge length×active gauge width). Important factors in determining optimum excitation voltage level of a strain gauge element include:

Surface area of the strain gauge element (active gage length×active gauge width).

Electrical resistance of the strain gauge element (high resistances permit higher voltages for a given power level).

Heat-sink properties of the deformable surface.

Some strain gauge designs known from the patent literature are briefly discussed herein below.

U.S. Pat. No. 4,322,707 describes a strain gage transducer designed to be secured to a spring, or double bending spring. The strain gage elements etched out of foil from which further conductor configurations have been simultaneously etched. These further conductor configurations are shunted by interruptable short circuits. Some of these configurations have such a shape that they are substantially nonsensitive to strain and hence located in a zone or zones of the spring or beam where the deformation due to strain is relatively small, for example in a central zone. Other configurations have a shape to exhibit large creeping. The latter shapes and the respective strain gage elements are secured to the spring or springs substantially in zones of large deformation.

U.S. Pat. No. 5,227,760 describes a strain gage that includes four gages that constitute a bridge circuit, and at least one resistance device which is used to adjust the offset voltage of the bridge circuit formed by the four gages. The resistance device is disposed on the strain gage between one of the gages making up the bridge circuit and a terminal thereof. Finally, each resistance device disposed on the strain gage has a series of resisting elements which vary in size and which are connected in parallel fashion.

The electrical resistance strain gage described in US Patent No. 2015/338294 includes a uniformly distributed electrical resistance of the active measuring area and a discrete electrical trim resistance within an active measuring area. The trim resistance may include an electrical conductor in an electrically parallel circuit such that the electrical conductor may be selectively electrically removed from the strain gage to trim the electrical resistance of the strain gage. The trim resistance does not modify the active strain sensing area or uniform grid length.

WO 2011/163442 suggests strain gage resistance calibration using shunts. The strain gage includes an insulating, substrate. A resistive grid is formed on the substrate. A plurality of shunts are associated with the resistive grid, each of the shunts include one or more shunting bars. Severing a shunting bar alters (e.g., increases) the resistance of the resistive grid. Severing of the shunting bars can be performed by: chemical etching, electro-chemical etching, a laser beam, metal cutting and particle blasting. Shunting bars can be located on at least one edge of the resistive grid or in an internal area within the resistive grid. In a preferred embodiment, the insulating substrate is flexible.

General Description

Disclosed are techniques for manufacturing substantially thin strain gauge elements with improved heat distributing and sinking capabilities, and for accurately setting their electrical resistances to high electric resistance values. The techniques disclosed herein aim to mitigate, alleviate or eliminate one or more of the abovementioned disadvantages.

One inventive aspect of the subject matter disclosed herein relates to a strain gauge element comprising at least one transducing element configured to change at least one electrical property thereof in response to deformations, and one or more trimming grids electrically connected to said at least one transducing element and configured and operable to accurately set a desired electrical resistance of the strain gauge element by setting the length of the conduction path(s) of one or more of the trimming grids. High electrical resistance of the strain gauge elements disclosed herein is achieved in some embodiments by fabricating the transducing element(s), and at least one of the trimming grid, from substantially thin and narrow layer of electrically conducting material.

The strain gauge element can comprise a substrate e.g., a thin deformable sheet or an object. The substrate can comprise at least one lumen in fluid communication with the deformable region for applying fluidic and/or gaseous pressure thereover. The at least one transducing element can be configured to change at least one electrical property thereof in response to deformations in the substrate. The strain gauge element can comprise at least one heat sink element thermally coupled to at least one of the at least one transducing element and the one or more trimming grids, and configured to dissipate heat developed during operation of the strain gauge device.

The term fluid used herein generally refers to a liquid or gas substance that is capable of flowing.

In some embodiments the thickness of the conductive material of the transducing element, and/or of the at least one trimming grid, is in a range of 5 to 1500 nanometer, optionally is a range of 50 to 500 nanometer, and their width is in a range of 1 to 250 micrometer, optionally is a range of 10 to 100 micrometer.

Optionally, and in some embodiments preferably, resistive components of the strain gauge element, such as the transducer element and the trimming grids, are separate components arranged to reside on separate surface areas of a substrate allocated for each component, or of an object. Each of the resistive components being spatially distributed in a form of a plurality of narrow electrically connected conducting lines (or strips) arranged to substantially occupy majority of the surface area allocated for each component. The arrangement of the resistive components on separately allocated surface areas in a form of a plurality of narrow resistive lines/strips substantially occupying majority of their allocated surface areas provides resistive components having substantially high resistance and wide surface areas occupied by the electrically conducting material, which substantially improves the heat dispersion of these components.

In addition, arranging the resistive components of the strain gauge elements over allocated separate surface areas further prevents, or minimize to negligible levels, the transfer of heat from the transducer element(s) towards the trimming grid(s), and also the transfer of heat from the trimming grid(s) towards the transducer element(s). Thus, in some embodiments, the surface area(s) allocated for the trimming grid(s) in each strain gauge element is relatively remote from the surface area allocated for the transducer element(s) to guarantee that the trimming grid(s) are placed over substantially stationary (non-deforming) region and substantially prevent or reduce transfer of heat between the trimming grid(s) and the transducer element(s).

Also disclosed herein bridge circuitries constructed from the strain gauge element configurations of the present application, arranged to provide a sensing device having the transducing elements of the strain gauge elements situated over a central surface area of the sensing device, and the trimming grids of the strain gauge elements situated over peripheral surface areas of the sensing device, distributed about, or substantially surrounding, the central surface area comprising the transducing elements. Optionally, a plurality of contact pads electrically connected to the transducing elements and their trimming grids are arranged along lateral sides of the sensing device.

The at least one heat sink element comprises in some embodiments a layer made of an electrically insulating material having high thermal conductivity properties. The electrically conducting elements of the strain gauge element are patterned in some embodiment on or in the electrically insulating layer of the at least one heat sink element. Alternatively, or additionally, the at least one heat sink element comprises one or more heat sinking patterns electrically and thermally coupled to the at least one transducer element.

Optionally, the at least one heat sink element comprises a heat sink layer having one or more spaced apart flat thin thermally conducting regions made of an electrically conducting material having high thermal conductivity properties. The electrically conducting elements of the strain gauge element can be patterned on or in an electrically insulating layer located above the heat sink layer. At least one of the one or more thermally conducting regions of the at least one heat sink element can be electrically and thermally coupled to the at least one transducing element and/or to the at least one trimming grid through one or more vias passing through the electrically insulating layer.

In some embodiments at least one of the one or more trimming grids comprises an array of parallel grid lines electrically connected in parallel by trimmable conduction paths. Each of the one or more trimming grids and the at least one transducing element can be structured from a plurality densely distributed electrically conducting lines configured to improve heat dispersion therefrom. Optionally, spatial distribution of the at least one transducing element and of the one or more trimming grids is configured to increase the heat dispersion of the element.

Optionally, and in some embodiments preferably, the substrate comprises at least one deformable region, and the at least one transducing element is located on, or in, the at least one deformable region.

One or more conducting regions (also referred to herein as conducting bars) can be used in the strain gauge element to permit altering its electrical resistance by application of vertical and/or lateral cuts therein. Optionally, and in some embodiments preferably, at least one of the trimming grids is electrically connected to the transducer element by one or more of the conducting regions.

A fine trimming grid can be used to introduce small changes in the electrical resistance of the strain gauge element, and a coarse trimming grid can be used to introduce large changes in the electrical resistance of the strain gauge element. The fine and/or coarse trimming grids can be electrically connected in series to the at least one transducing element. Optionally, the fine and coarse trimming grids are located at opposite sides of the transducer element. Optionally, and in some embodiments preferably, at least one of the fine and coarse trimming grids is electrically connected to the transducer element via at least one of the one or more conducting regions. Alternatively, the fine trimming grid, the coarse trimming grid, and the one or more conducting bars, are implemented as a single unit In some embodiments the grid lines in the fine and coarse trimming grids are substantially of the same length. The grid lines of the coarse trimming grid can be substantially narrow relative to the grid lines of the fine trimming grid. Optionally, the grid lines of the coarse and fine the trimming grids have the same width and different lengths and/or different thicknesses, configured to define suitable resistivity of each grid line for adjustment of the electrical resistance of the strain gauge device.

At least one protective layer can be applied on the strain gauge element to substantially cover its electrical components. Optionally, the at least one heat sink element is utilized as an electrical ground, or as an antenna usable for communicating radio frequency transmitted signals/data.

Another inventive aspect of the subject matter disclosed herein relates to a sensing device comprising at least four strain gauge elements according to any one of the embodiments described hereinabove and hereinbelow, arranged on the same substrate and electrically connected to each other to form a bridge circuitry. Optionally, the sensing device configured such that at least one of the strain gauge elements are subject to deformations.

Yet another inventive aspect of the subject matter disclosed herein relates to a method of fabricating a strain gauge element. The method comprising preparing a substrate, providing at least one heat sink element, patterning/forming on, or in, the substrate at least one transducer structure and one or more trimming grids electrically connected thereto, the at least one transducer structure and one or more trimming grids thermally coupled to the at least one heat sink element, and applying one or more cuts to said one or more trimming grids to set a length of a conduction path of the one or more trimming grids to thereby accurately set electrical resistance of said strain gauge element. Optionally, the patterning/forming comprises electrically and thermally coupling the at least one heat sink element to the at least one transducer structure.

The at least one heat sink element can comprise a layer made of an electrically insulating material, and the patterning/forming can comprise patterning/forming the at least one transducer structure and one or more trimming grids on, or in, the electrically insulating layer of the least one heat sink element.

In some embodiments the preparing of the substrate comprises forming at least one deformable region is the substrate. In such embodiments the patterning/forming is configured to locate the at least one transducer structure on, or in, the deformable region. The patterning/forming can be configured to locate the one or more trimming grids remote from the deformable region.

Optionally, and in some embodiment preferably, the patterning of the one or more trimming grids comprises forming a plurality grid lines electrically connected to each other in parallel, and the applying of the one or more cuts comprises changing at least one electrical parallel connection between the grid lines into an electrical serial connection. In addition, the patterning can comprise forming one or more conducting regions electrically connecting between at least one of the one or more trimming grids and the at least one transducer element. The method can comprise applying one or more cuts in the one or more conducting regions to alter the electrical resistance of the strain gauge element.

A protective layer can be applied in some embodiment over at least the transducer element and the trimming grids after applying the one or more cuts. Alternatively, the protective layer can be applied after applying the one or more cuts.

In some embodiments the preparing of the substrate comprises forming at least one insolation layer configured to electrically insulate the at least one heat sink element from the patterned components. The at least one heat sink element is optionally made from an electrically conducting material. The method comprises in some embodiments forming one or more vias in the at least one insolation layer to electrically and thermally couple between the at least one heat sink element and the at least one transducer structure by at least partially filling the vias with material(s) having good thermal and electrical conductance properties (e.g., Copper, Aluminum).

Another inventive aspect of the subject matter disclosed herein relates to a measurement setup comprising a substrate, a heat dissipation layer (referred to herein as heatsink layer) placed on, or above, at least one surface area of the substrate, and a strain gauge layer placed above or over the heat dissipation layer. The power/heat dissipation layer is configured to prevent heating of the substrate by heat produced by the strain gauge layer and/or prevent over heating of the strain gauge layer. Optionally, and in some embodiments preferably, an isolation layer is provided for electrically insulating between the heat dissipation layer and the strain gauge layer, for electrically insulating therebetween. One or more vias can be utilized to electrically and/or thermally couple between the heat dissipation layer and the strain gauge layer. Optionally, and in some embodiments preferably, a protective layer is applied over the strain gauge layer configured to protect it from external events and/or conditions.

In some embodiments the isolation layer is used as the substrate on which the strain gauge element is patterned/formed. Optionally, the substrate or the heat dissipation layer is made from an electrically insulating material.

A further inventive aspect of the present application relates to a measurement setup comprising a substrate, a strain gauge layer comprising at least four strain gauge elements, each comprising at least one transducing element and one or more trimming grids, the strain gauge elements are arranged above the substrate such that the at least one transducing element of each strain gauge element is located substantially within a central region of the setup, and such that the one or more trimming grids of each strain gauge element are located in peripheral regions of the setup substantially not being susceptible to deformations. In some embodiments the measurement setup comprises at least one heat dissipation layer.

Further inventive aspects of the present disclosure are apparent from the following detailed description.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 8A and 8B schematically illustrate another possible Wheatstone bridge setup utilizing trimming elements configured to permit various different resistant adjustments, wherein FIG. 8A shows the Wheatstone bridge setup and FIG. 8B exemplifies various possible trimming schemes;

FIGS. 11A to 11C schematically illustrate different configurations of transducing elements having thermally coupled heat sink bodies configured according to possible embodiments to improve their heat dissipation, wherein FIG. 11A shows a transducing element having a single wide heat sink rib surrounding a majority of the circumference of the transducing element, FIG. 11B shows a transducing element having a plurality of heat sink ribs surrounding a majority of the circumference of the transducing element, and FIG. 11C shows a transducing element having a plurality of heat sink bodies distributed along a major circumference of the transducing element;

DETAILED DESCRIPTION OF EMBODIMENTS

Figure 1:
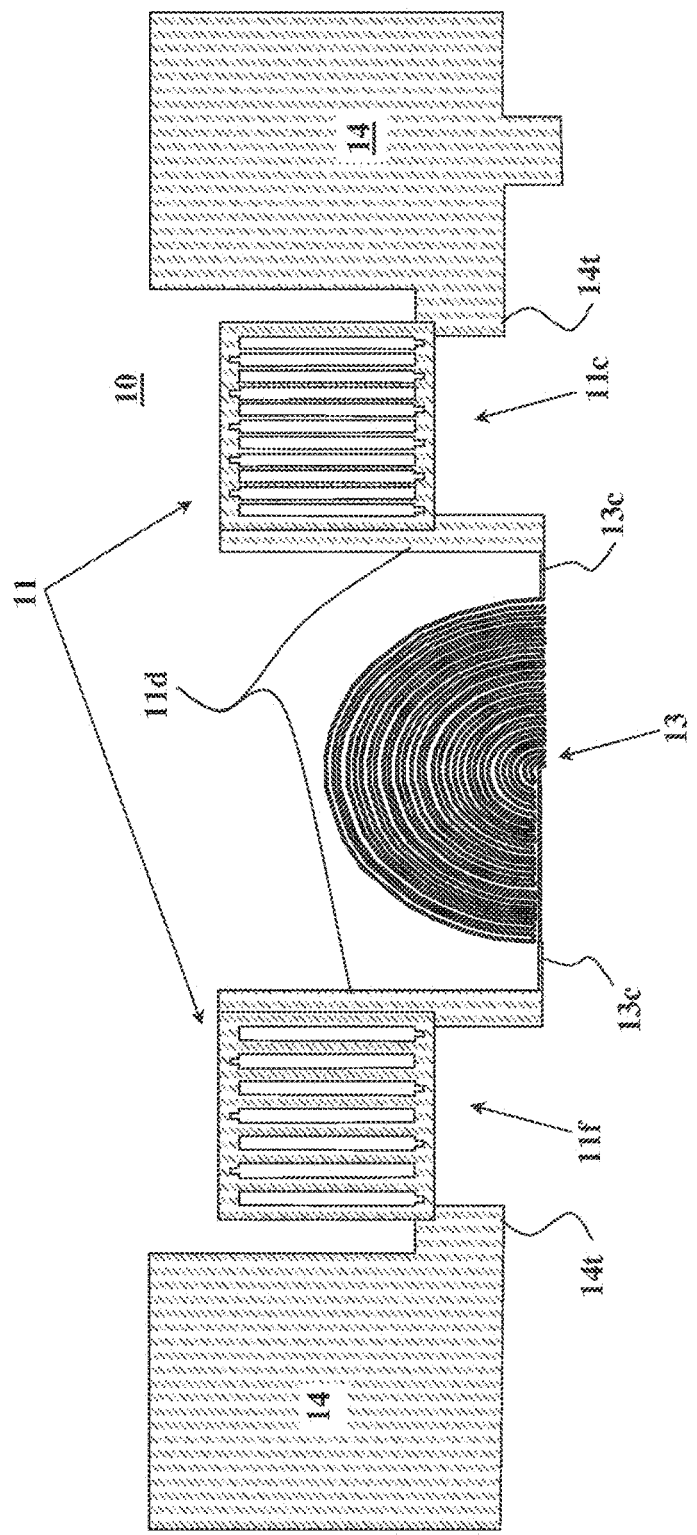
FIG. 1 schematically illustrates a strain gauge element according to some possible embodiments.

One or more specific embodiments of the present application will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, emphasis instead being placed upon clearly illustrating the principles of the invention. This invention may be provided in other specific forms and embodiments without departing from the essential characteristics described herein.

The present disclosure provides strain gauge embodiments particularly useful for use in devices made of plastic/polymeric based materials or other low heat-conductive materials, such as, but not limited to, described in International Patent Publication No. WO 2015/114635, of the same applicant hereof, the disclosure of which is incorporated herein by reference. Strain measurement conducted on a plastic deformable surface/substrate requires special consideration. The strain gauge embodiments disclosed herein are designed to increase the maximum excitation voltages that can be used to drive the gauge elements, particularly when thermally and/or electrically coupled on a conductive material, due to the improved heatsink capacity obtained.

Most plastic materials act as thermal insulators rather than heat sinks, and thus extremely low excitation voltage values should be used in strain gage devices/elements incorporated on/in devices/elements made of plastic materials in order to avoid serious self-heating effects. In addition, the modulus of elasticity of the common plastic materials drops rapidly as temperature rises, which increase viscoelastic effects, and can significantly affect the material properties in the area under the strain gage device/element.

Accordingly, the gauge excitation voltages on plastic substrates (either foil strain gauge or gauge deposited directly on plastic e.g., plastic substrate/wafer) should be kept within defined low ranges to avoid self-heating effect and instability. The low excitation voltage levels of the gauge element entails lower output voltages (e.g., if the output voltage is 1V instead than 5V the output signal is 5 time lower). In addition, if the dimensions of the strain gauge element are small (small gauge area) the excitation voltage used therewith needs to be further lowered.

When mounting on plastic/polymeric based materials standard strain gauge elements, having electrical resistances of about 120 $\Omega$÷350$\Omega$ (Ohms), or 1000$\Omega$, the excitation voltage that can be used can get below 0.1V÷0.3V, thus making the use of strain gauge measurements practically impossible on such plastic/polymeric based materials. The present application provides strain gauge designs, and techniques for manufacturing high resistance strain gauge elements on substrates having poor heat conductivity properties, such as, but not limited to, plastic/polymeric substrates, with the possibility to add heatsink layer(s) to permit use of regular, or even higher, excitation voltage levels with the strain gauge elements.

A main problem of high resistance strain gauges is that the metal film (e.g., Ni, Cr, Tantalum, constantan alloy, NiCr alloy, Gold, etc.) patterns of the resistive element needs to be very thin (5 nm to 500 nm), and thus substantially susceptible to fabrications inaccuracies. The thickness (t) of the metal foil/thin layer and the width (w) of the pattered strain gauge, defines the electrical resistance $R=(L/A)*\rho$ where, L is the length of the metal pattern, A is its cross section area, which is typically defined as thickness (t)×width (w), and $\rho$ is the electrical resistivity (aka specific electrical resistance) of the material of the metal foil/thin layer.

The electrical resistance of strain gauge elements is very sensitive to process parameters. For example, for a strain gauge element having a length of L=50 mm, thickness of t=100 nm, width of w=50 μm, and p=1*10e−6 Ω*m, the ideal resistance is $R=L*\rho/(t*w)=10K\Omega$ (kilo-ohm). If a ±2% thickness error (±2 nm) and a ±2% width error (±1 μm) is due to process repeatability, the electrical resistance obtained can be actually between R=9.6 KΩ and R=10.4KΩ, instead of 10KΩ. The process repeatability errors considered in this example are low, where in fact these values are usually higher, especially in mass production processes where the size of the plastic substrate is big. In such mass production processes the error can be even about 5% on the metal thickness, and about 2-4% on the width of the patterned features. This means the electrical resistance actually obtained can vary between 9.2KΩ and 10.8 KΩ. However, these variations in the electrical resistance of the strain gauge elements are not acceptable, and need to be reduced to about 0.1-0.01%.

In some embodiments the strain gauge elements are trimmed to adjust their electrical resistances into substantially the same value within an error of 0.1-0.1%. In the above example, all of the strain gauge elements can be trimmed to obtain an electrical resistance value close to the maximal value of about 11 KOhm. FIG. 1 schematically illustrates a strain gauge element 10 configured according to some possible embodiments to minimize electrical resistance variations of the element and provide improved heat distribution and sink, and thereby enable manufacturing substantially thin (about 5 nm to 500 nm) and accurate electrical resistors. The strain gauge element 10 comprises two contact pads 14 electrically connected to a resistive transducing element 13 through one or more trimming grids. In this specific and non-limiting example two trimming grids, 11c and 11f (collectively referred to herein as trimming grid 11) are used in the strain gauge element. Each trimming grid 11 is electrically connected via a conducting tab element 14t at one end thereof to a respective contact pad 14 of the strain gauge element 10, and via a vertical elongated conducting bar 11d at another end thereof to a respective terminal 13c of the resistive transducing element 13.

As will be described hereinbelow, the electrical resistance of the trimming grids 11, and/or of the elongated conducting bars 11d (also referred to herein as conducting regions), of the strain gauge element 10, can be adjusted and fine-tuned during, or after, the manufacturing process, to set a desired substantially accurate electrical high resistance of the strain gauge element 10. For this purpose, in some embodiments, one of the trimming grids is configured as a fine grid 11f, having a plurality of wide grid lines (11r in FIGS. 2 and 3) i.e., having relatively lower electrical resistances, and the other trimming grid is configured as a coarse grid 11c, having a plurality of narrow grid lines i.e., having relatively higher electrical resistance. In addition, the spatial distribution of the grid bars 11r, and having them arranged in two separate groups, 11e and 11f, wherein each group of grid lines 11r being located relatively remote one from the other, and optionally from the resistive transducing element 13, improves the heat distribution and sinking of the strain gauge element. This way transfer of heat from the grid lines 11r to the transducing element 13 is substantially prevented or reduced to negligible levels.

The transducing element 13 may be implemented by an electrically conducting line arranged to form a dense wavy pattern for maximizing its length and thereby improve sensitivity and increase surface area covered by the dense line patterns. Optionally, and in some embodiments preferably, the resistive transducing element 13 is made from a plurality of conductive lines configured to form interfolding patterns. In this specific and non-limiting example a circular arrangement (e.g., Rosette type) of the resistive transducing element 13 is exemplified, wherein a plurality of arc-shaped conductive lines patterns successively interfold one into the other to form a generally half circle sensor shape (also known as a Rosette pattern). It is however noted that any other suitable successively interfolding patter can be used to form the transducing element having different shapes e.g., rectangular, triangular, polygonal, etc.

The conducting lines of the stain gauge element 10 can be manufactured from any suitable electrically conducting material, such as, but not limited to, Gold (Au), Copper (Cu), Platinum (Pt), Aluminum (Al), Chrome (Cr), Nickel (Ni), Nickel-Chrome (NiCr) or theirs alloy, deposited/laminated on an object or substrate (e.g., deformable surface/membrane). For example, the conducting lines can be applied by sputtering, evaporation, electroforming, lamination, conductive printing. The strain gauge element 10 may be used in any of the MEM devices disclosed in International Patent Publication No. WO 2015/114635.

Figure 2:
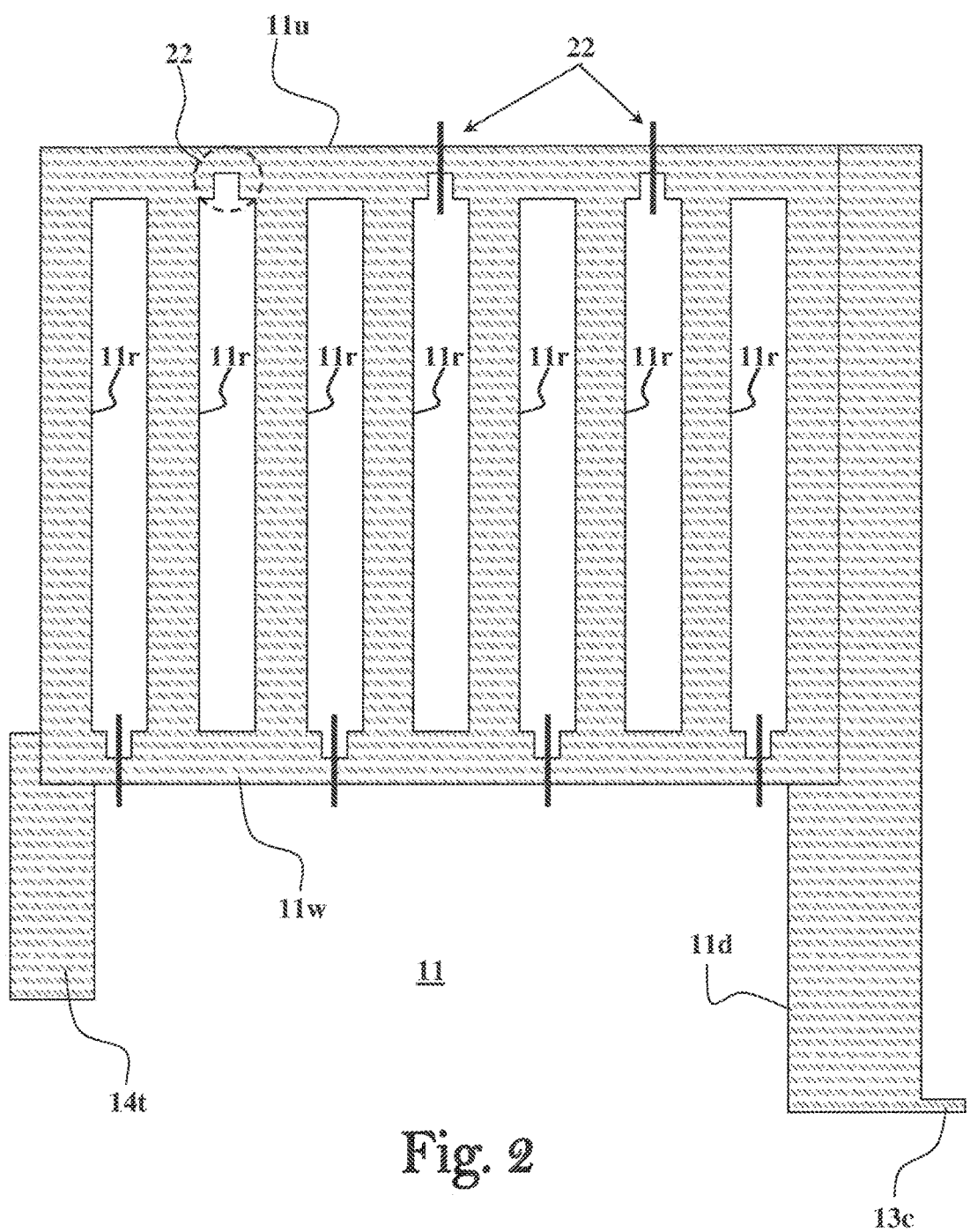
FIG. 2 schematically illustrates an adjustable resistive grid (also referred to herein as trimming grid) of the strain gauge element according to some possible embodiments.

A possible embodiment of a trimming grid 11 is shown in FIG. 2. The trimming grid 11 comprises upper and lower horizontal spaced apart electrically conducting bars, 11u and 11w respectively, and a plurality of vertical spaced apart electrically conducting grid lines 11r extending between the horizontal bars 11u substantially in parallel to the vertical elongated conducting bar 11d. Each one of the horizontal bars 11u and 11w comprises one or more notches 22 indicating cutting/trimming locations (e.g., laser, mechanical, chemical, or suchlike cutting/trimming techniques) for adjusting the electrical resistance of the trimming grid 11 and thereby setting a desired electrical resistance for the strain gauge element 10. The notches 22 may be provided facing the gaps between each pair of adjacently located vertical grid lines 11r of the trimming grid 11. Optionally, and in some embodiments preferably, the locations of the notches 22 in the upper horizontal bar 11u are interlaced with respect to the locations of the notches 22 in the lower horizontal bar 11w i.e., viewed from left to right, the notches 22 in the lower bar 11w are in the odd gaps and the notches 22 in the upper horizontal bar 11u are in the even gaps, or vice versa.

Figure 3:
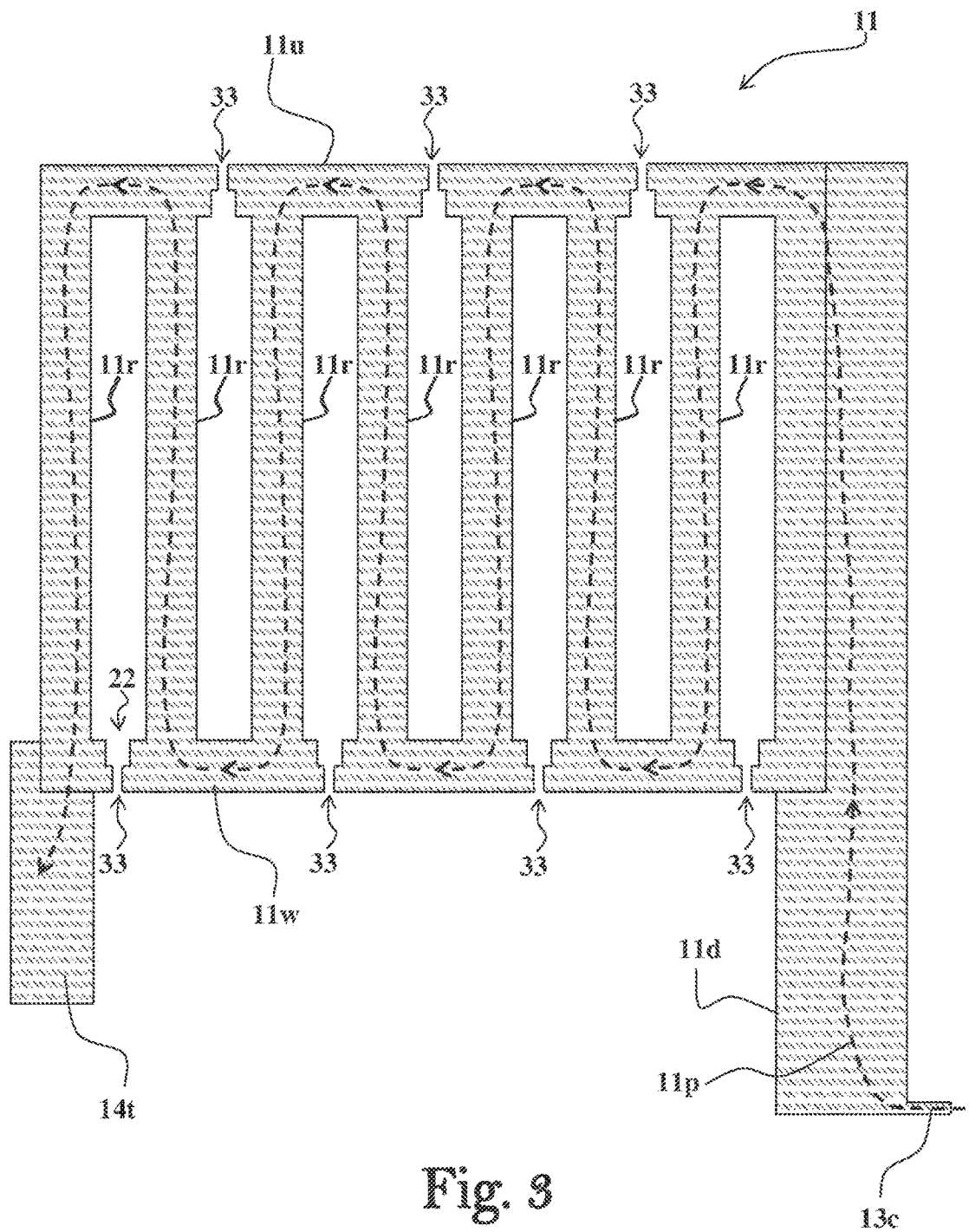
FIG. 3 schematically illustrates possible setting/trimming of the adjustable resistive grid of the strain gauge element according to a possible embodiment.

FIG. 3 shows the trimming grid 11 after applying laser cuttings 33 at the locations of the notches 22. The dotted-arrowed lines 11p show the flow of electric current passing from the elongated conducting bar 11d to the grid 11 (the conduction path), and therefrom via the tab element 14t to the respective contact pads 14 (not shown). As seen, the electrical discontinuities formed by the laser cuttings 33 made at interlaced notch locations in the upper and lower horizontal bars, 11u and 11w, forms a wavy/sinusoidal conduction path, which thus increases the length of the formed conduction path and correspondingly its electrical resistance.

In this specific and non-limiting example the cuttings/trimmings 33 are configured to yield the maximal conduction path achievable by the grid 11. This means that parallel connection of all of the grid lines 11r is converted into a serial connection, such that if the electrical resistance of each grid line section is about $R_L$ the electrical resistance of the trimmed grid 11 is converted from $R_L/n$ into $n \cdot R_L$, where n>1 is an integer number designating the number of grid lines 11r. The manufacturing process of the strain gauge may however comprise a step of determining how many cuttings 33 should be applied in each of the fine grid 11f and the coarse grid 11e to form a conduction path suitable to adjust the electrical resistance of the grid. The grid trimming process involves determining whether to apply, or not apply, a cutting/trimming between each pair of adjacently located grid lines 11r in order for the conduction path 11p to provide a desired resistance, and can be thus considered as a digital trimming process, wherein each cut 33 is equivalent to a specific resistance increment.

This trimming process can include determining a number of cuts of needed in the fine trimming grid 11f, and a number of cuts $n_c$ needed in the coarse trimming grid 11e, to achieve a desired total resistance $R_T$ (also referred to herein as the target resistance) of the strain gauge element 10. For example, if each trimming grid 11 comprises n grid lines 11r, and assuming the electrical resistance of the transducing element 13 is about $R_x$, then the trimming process can adjust the total resistance $R_T$ of the strain gauge element 10 by determining the number of cuts $n_f$ (0<$n_f$<n is an integer) and $n_c$ (0<$n_c$<n is an integer) needed to obtain the desired total resistance, as follows:

$$R_T = R_x + R_c \cdot \left(n_c + \frac{1}{n - n_c}\right) + R_f \cdot \left(n_f + \frac{1}{n - n_f}\right)$$

where $R_f$ is the electrical resistance of each grid line section in the fine trimming grid 11f, and is the electrical resistance of each grid line section in the coarse trimming grid 11c. The electrical resistance tuning of the above equation can be achieved if one or more consecutive cuts 33 are applied starting, or ending, at one of the edges of a trimming grid 11. However, other trimming approaches may be employed for obtaining finer and/or different electrical resistance adjustments.

In some embodiments the fine trimming grid 11c is configured to introduce electrical resistance changes in the range of 0.05% to 6%, optionally about 0.05 to 1.5%, of the target resistance value of the strain gauge element, and the coarse trimming grid 11f is configured to introduce electrical resistance changes in the range of 3% to 30%, optionally about 1% to 10% of the target resistance value of the strain gauge element.

Accordingly, the cuttings 33 made in the coarse trimming grid 11c will result in a greater change/adjustment of electrical resistance of the strain gauge element, and the cuttings 33 made in the fine trimming grid 11f will result in a mild/finer change/adjustment of electrical resistance of the strain gauge element. The trimming process can be thus a two stage process, starting in the trimming of the coarse trimming grid, and thereafter trimming of the fine trimming grid. Particularly, in the first stage it is determined if the current resistance value of the strain gauge element greatly deviates from the desired target resistance, and if so, one or more cuttings are made in the coarse trimming grid until the difference between the desired target resistance and the actual resistance (after the trimming of the coarse trimming grid) becomes smaller than the average electrical resistance of a grid line in the coarse trimming grid, or the difference become smaller than the maximum resistance changes achievable using the fine trimming grid. In the second stage, one or more cuttings are made in the fine trimming grid until the difference between the desired target resistance and the actual resistance (after the trimming of the fine trimming grid) becomes smaller than the average electrical resistance of a grid line in the fine trimming grid. In this way the electrical resistance of the strain gauge 10 can be accurately set by determining how many cuttings 33 should be made in the fine and coarse trimming grids.

Figure 4:
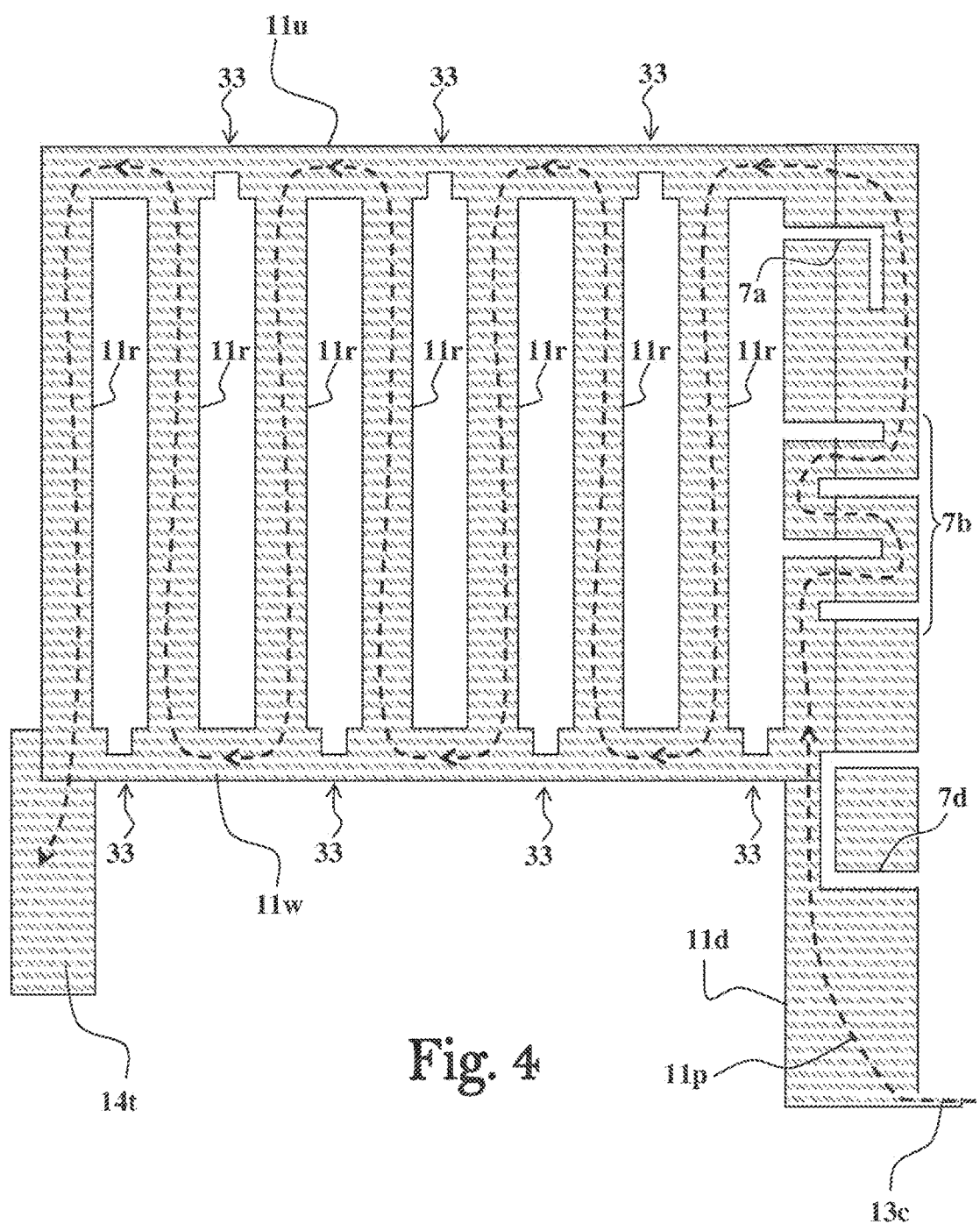
FIG. 4 schematically illustrates possible adjustments applied to the adjustable resistive grid of the strain gauge element according to some possible embodiments.

FIG. 4 shows vertical and/or lateral cuttings that may be applied to the elongated conducting bar 11d for further fine-tuning the electrical resistance of the strain gauge. For example, one or more right angled, "]"-shaped or "["-shaped, cuttings 7a, extending from a lateral side of the elongated conducting bar 11d, may be used to constrict the conduction path along a certain section of the elongated conducting bar 11d, and thereby add a resistive component to the overall resistance of the strain gauge element. Additionally or alternatively, one or more lateral "‾_"-shaped cuttings 7b, extending from opposing lateral sides of the elongated conducting bar 11d, may be used to form constrictions in the conduction path along a certain section of the elongated conducting bar 11d, and thereby add resistive component(s) to the overall resistance of the strain gauge element. Additionally or alternatively, one or more "C"-shaped ("]"-shaped or "["-shaped) cuttings 7d, extending from a lateral side of the elongated conducting bar 11d, may be used to form constrictions in the conduction path along a certain section of the elongated conducting bar 11d, and thereby add resistive component(s) to the overall resistance of the strain gauge element. The laser cuttings 7a, 7b and 7d, may be each configured to introduce electrical resistance changes in the range of 0.001% to 5% of the target resistance value of the strain gauge element.

The process of introducing the cuttings/trimming patterns 7a, and/or 7b, and/or 7d, and determining the lengths of the constricted conduction paths they form in the elongated conducting bar 11d, is referred to herein as analog trimming. In possible embodiments the strain gauge element comprises more than two trimming grids usable for digital trimming, and/or more than two conducting bars 11d usable for analog trimming Optionally, and in some embodiments preferably, the trimming grids comprise grid lines 11r having different line widths (e.g., between 0.01 to 2000 μm), according to the resistance increments required per implementation (wider grid lines lower the resistance increments the grid line can add). In Addition, each trimming grid may also comprise grid lines 11r having different widths.

Figure 5:
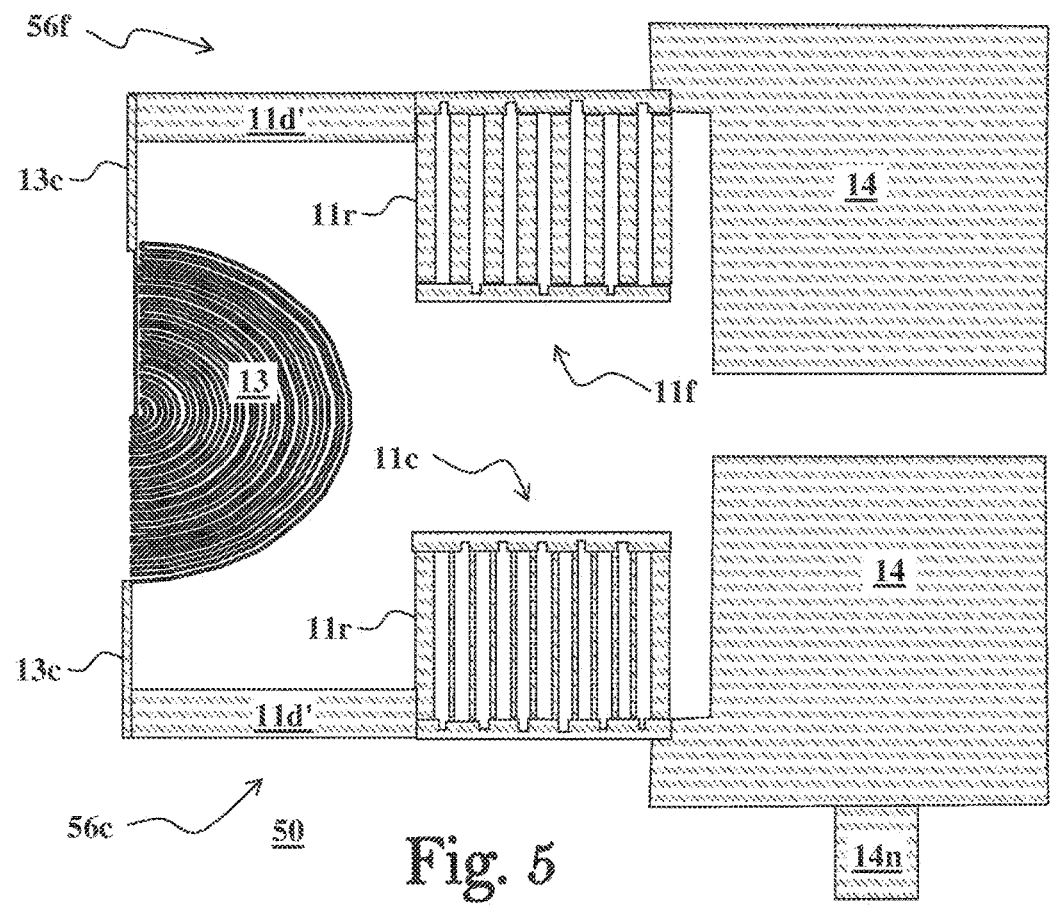
FIG. 5 schematically illustrates a possible arrangement of the strain gauge element according to some possible embodiments.

The geometrical dimensions of the strain gauge element 10 shown in FIG. 1 can generally be about 0.2×0.2 to 50×50 mm. These configurations yield an elongated element structure, capable of more efficiently distributing/sinking heat produced by distributing the different electrical resistive components of the element along its length. A more compact strain gauge configuration 50 is shown in FIG. 5. In this non-limiting example serial connection between each contact pad 14 and its respective trimming grids 11 form two spaced apparat and substantially parallel arms, 56f and 56c. Each arm 56f and 56c also includes the elongated conducting bar 11d', which is substantially similar to the bar 11d connecting between the trimming grids and the resistive transducing element 13 of the strain gauge element 10. However, the elongated conducting bar 11d' in the strain gauge element 50 is substantially perpendicular to the grid lines 11r of the fine and coarse trimming grid, 11f and 11c respectively.

The electrical resistance of the strain gauge element 50 can be accurately adjusted by applying the analog trimming, by forming constricted conduction paths of defined lengths by cut patterns 7a, and/or 7b, and/or 7b, in the conducting bar 11d', as exemplified in FIG. 4, and/or by applying the digital trimming process described hereinabove, as exemplified in FIG. 3.

The arms 56f and 56c of the gauge element 50 are electrically connected to the terminals 13c of the resistive transducing element 13, forming together a substantially vertical interconnection between the two parallel arms 56f and 56c. This configuration provides a more compact arrangement of the components of the strain gauge element 50, which also efficiently distribute/sink heat by spatially distributing resistive components thereof over substantial surface areas and relatively remote to the resistive transducing element 13, which also substantially prevent/reduce transfer of heat thereto.

The strain gauge elements 10 and 50 are implemented to provide high resistance gauges manufactured by depositing/laminating metal (e.g., by sputtering, evaporation, or lamination) on a plastic/polymeric substrate, followed by lithography process (e.g., wet etching or liftoff) for creating the desired gauge pattern. Optionally, and in some embodiments preferably, once the gauge pattern is formed on the substrate, it is coated with a plastic protective layer. In some embodiments the strain gauge elements 10 and 50 are deposited on a thin deformable foil/film to be attached to an object/surface which strain is to be measured.

In order to improve the heat dispersion of the strain gauge element, the resistive components (i.e., the transducing elements and the trimming grids) are patterned over separated surface areas allocated for each component, to thereby substantially prevent, or reduce to negligible levels, transfer of heat between the components. In addition, by arranging the resistive components in a form of densely distributed conducting line (the line are placed one close to the other in a repetitive/interfolding pattern), such that they occupy a majority of the surface area allocated for them, their hear dispersion is improved as greater surface area of electrically conducting material is available to radiate the heat.

The strain gauge element 10, or 50, according to some embodiments is designed such that only an area of the element comprising the resistive transducing element 13 is subject to deformations, while other areas of the element 10 containing the trimming grids 11, the elongated conducting bar 11d, and the contact pads 14 do not experience such deformations. It is thus required in some embodiments to place the trimming grids 11, the elongated conducting bar 11d, and the contact pads 14, remote from the transducing element 13, and/or over non-deforming portions of the object, and/or film/foil, on which the element is implemented.

In some embodiments at least one of the trimming grids 11 is located remote from the transducing element 13 to substantially prevent/reduce transfer of heat between the at least one trimming grid 11 and the transducing element 13, and to improve the heat dispersion of the element 10. In addition, arranging the trimming grids 11 in a form of an array of grid lines 11r densely covering a separate surface area increases the power/heat dissipation area of the strain gauge element, and thereby improves its heatsink capacity. Though in the examples described and illustrated herein the trimming grids are arranged as an array comprising one row grid lines 11r, in possible embodiments they can be arranged to form array structure comprising two or more rows of grid lines 11r.

Figure 6:
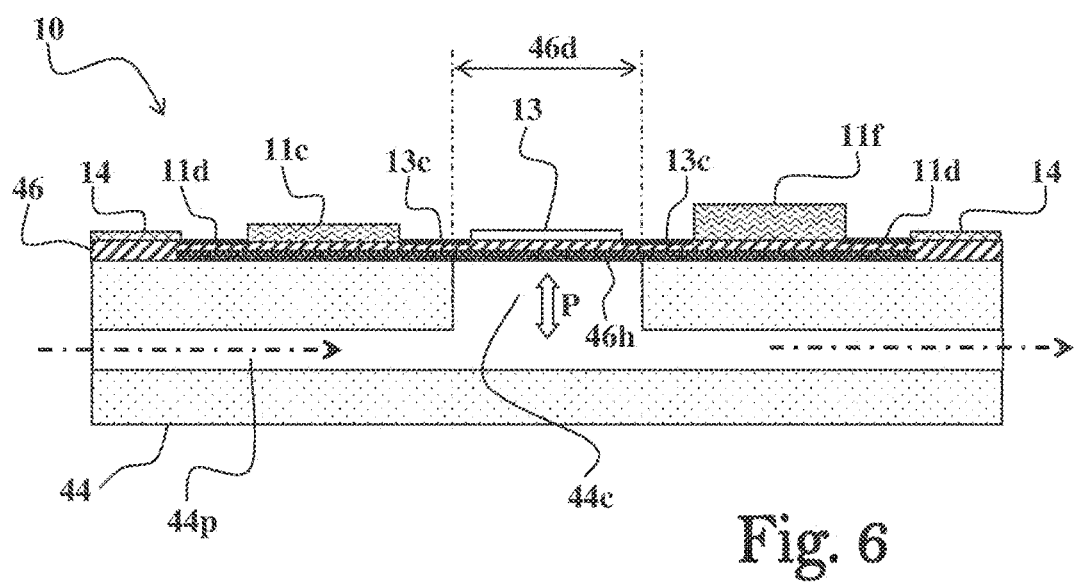
FIG. 6 schematically illustrates a strain gauge element according to some possible embodiments operably attached to an object.

FIG. 6 schematically illustrates a possible application of the strain gauge element 10 (or 50) according to some possible embodiments. In this specific and non-limiting example the strain gauge element 10 is implemented on a thin film/foil 46 attached to an object 44. The strain gauge element 10 can be patterned on the thin film/foil 46 before, or after, it is attached to the object 44. Optionally, and in some embodiments preferably, the thin film/foil 46 is made from materials having poor/very low electrical conductivity, and/or electrically insulating materials, such as, but not limited to (kapon, polyimide, peek, polycarbonate, ultem, and any other suitable polymer). In some embodiments the thin film/foil 46 comprises one or more thermally conducting layers 46h at least in areas of the device comprising the transducing element 13, the trimming grids 11, the elongated conducting bars 11d, and optionally also the contact pads 14, for sinking/dispersing heat from these electrically resistive components.

The one or more thermally conducting layers 46h can comprise electrically conducting materials, and in this case such electrical conducting materials are covered by one or more electrically insulating layers of the thin film/foil 46 in order to prevent formation of electrical contacts between the thermally conducting layers 46h and the electrical components of the strain gauge element 10.

The object 44 comprises a flow path/lumen 44p passing therein for introducing fluid substance thereinto, and a cavity 44c sealably closed by the film/foil 46 and being in fluid communication with the flow path/lumen 44p. The fluid introduced into, and/or streamed through, the object 44, fills the cavity 44c and interacts with the portion of the film/foil 46 placed over the opening of the cavity 44c, thereby applying fluid pressure P thereover. The transducing element 13 is located in a region 46d of the thin foil/film located over the opening of the cavity 44c, and thus the fluid pressure P evolving inside the cavity 44c causes the portion of the film/foil 46 placed over the opening of the cavity 44c to deform, which thereby causes measurable changes in the electrical properties of the transducing element 13 located thereon. In this way, changes in the electrical resistance of the transducing element 13 responsive to fluid pressure P can be measured via the contact pads 14 of the strain gauge element 10.

In this specific and non-limiting example only the transducing element 13 is located over a deformable region 46d of the object 44 by placing it on/in a portion of the thin film/foil 46 covering the opening of the cavity 44c, while the other electrical components of the strain gauge element 10 i.e., the trimming grids 11c and 11f, the conducting bar 11d, and the contact pads 14, are located on substantially static/stationary regions of the object 44 that don't experience the deformations caused by the fluid pressure P. Accordingly, in some embodiments the foil/film 46 is configured to have at least one deformable region 46d, while all other regions thereof are made substantially rigid/non-deformable.

The trimming grids 11f and 11c are located on separate regions of the foil/film 46, which can be located somewhat remote from the deformable region 46d, to prevent, or substantially reduce transfer of heat therefrom towards the transducing element 13. In this specific and non-limiting example the trimming grids, 11c and 11f, are located at opposite sides slightly remote from the transducing element 13. This spatial distribution of the transducing element 13 and the trimming grids, 11e and 11f, further improves the heat dispersion of the strain gauge element. This spatial arrangement of the trimming grid increases the area of the strain gauge element and improve its heat sink capacity.

As illustrated in FIG. 6, the electrically conducting patterns of the strain gauge element 10 can have different thicknesses. For example, the thicknesses of the deposited trimming grids 11 may be different from the thickness of the deposited transducing element 13 and/or of the contact pads 14. In this specific and non-limiting example the thickness of the fine trimming grid 11f is greater than the thickness of the coarse trimming grid 11e, since the grid lines 11r of the fine trimming grid 11f are required to exhibit lower electrical resistances. The contact pad can have in some embodiments an additional material layer (e.g., comprising gold) to improve their connectivity and prevent their oxidation/deterioration. However, in some embodiments all of the electrical components of the strain gauge element 10 have substantially the same thickness.

Figure 7:
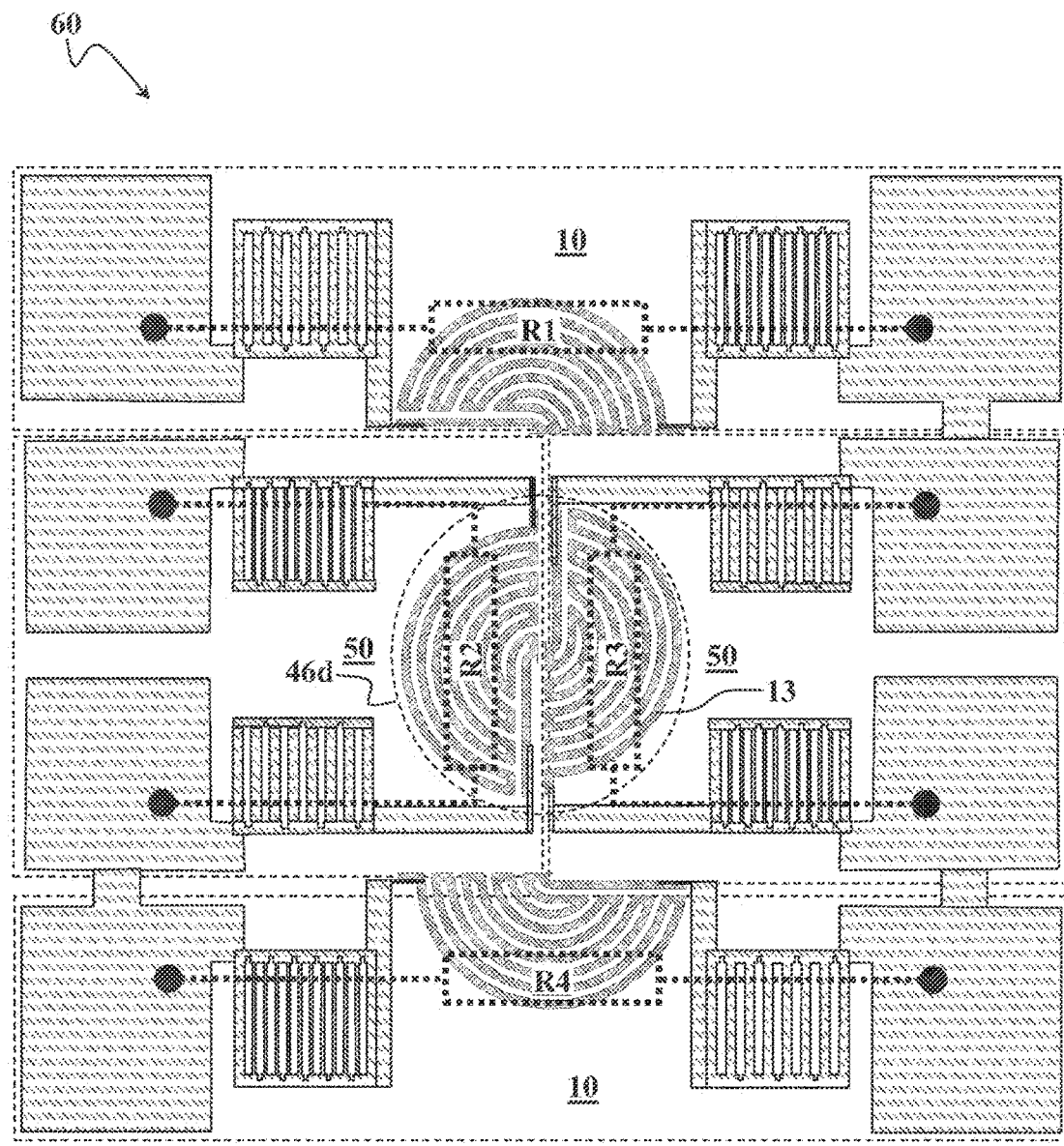
FIG. 7 schematically illustrates a possible Wheatstone bridge setup using possible embodiments of the strain gauge element disclosed herein.

FIG. 7 schematically illustrates a possible sensing device using a Wheatstone bridge setup 60 implemented by possible embodiments of the strain gauge element disclosed herein. The first resistive element R1 of the Wheatstone bridge 60 is implemented by a strain gauge element 10 (as shown in FIG. 1) electrically connected in series to the third resistive element R3 of the bridge 60 that is implemented by a strain gauge element 50 (as shown in FIG. 5). The third resistive element R3 is electrically connected in series to the fourth resistive element R4 of the bridge 60 that is implemented by a strain gauge element 10, which is electrically connected in series to the second resistive element R2 of the bridge 60 that is implemented by a strain gauge element 50.

Optionally, and in some embodiments preferably, only the transducing elements 13 of the R2 and R3 resistive elements are placed on/in deformable surface areas 46d of the sensing device 60, while all other elements/components are placed over stationary surface areas, to thereby obtain an Half Wheatstone bridge configuration. In this configuration the transducing elements 13 of the resistive elements R2 and R3 that are located on/in the deformable surface areas 46d form a circular structure, and the transducing elements 13 of the resistive elements R1 and R4 that are located on/in the non-deformable/stationary surface areas are located at opposite sides of, and slightly remote from, the circular arrangement formed on/in the deformable surface areas 46d. Thus, heat dispersion is improved, and transfer of heat between the transducing elements is substantially prevented/reduced. In possible embodiments a single transducing element is placed on the deformable surface areas 46d of the sensing device 60.

In this configuration the electrical resistance of each resistive element of the Wheatstone bridge 60 can be accurately set after patterning the strain gauge elements 10 and 50, using the digital and/or analog techniques described hereinabove.

Figure 8A:
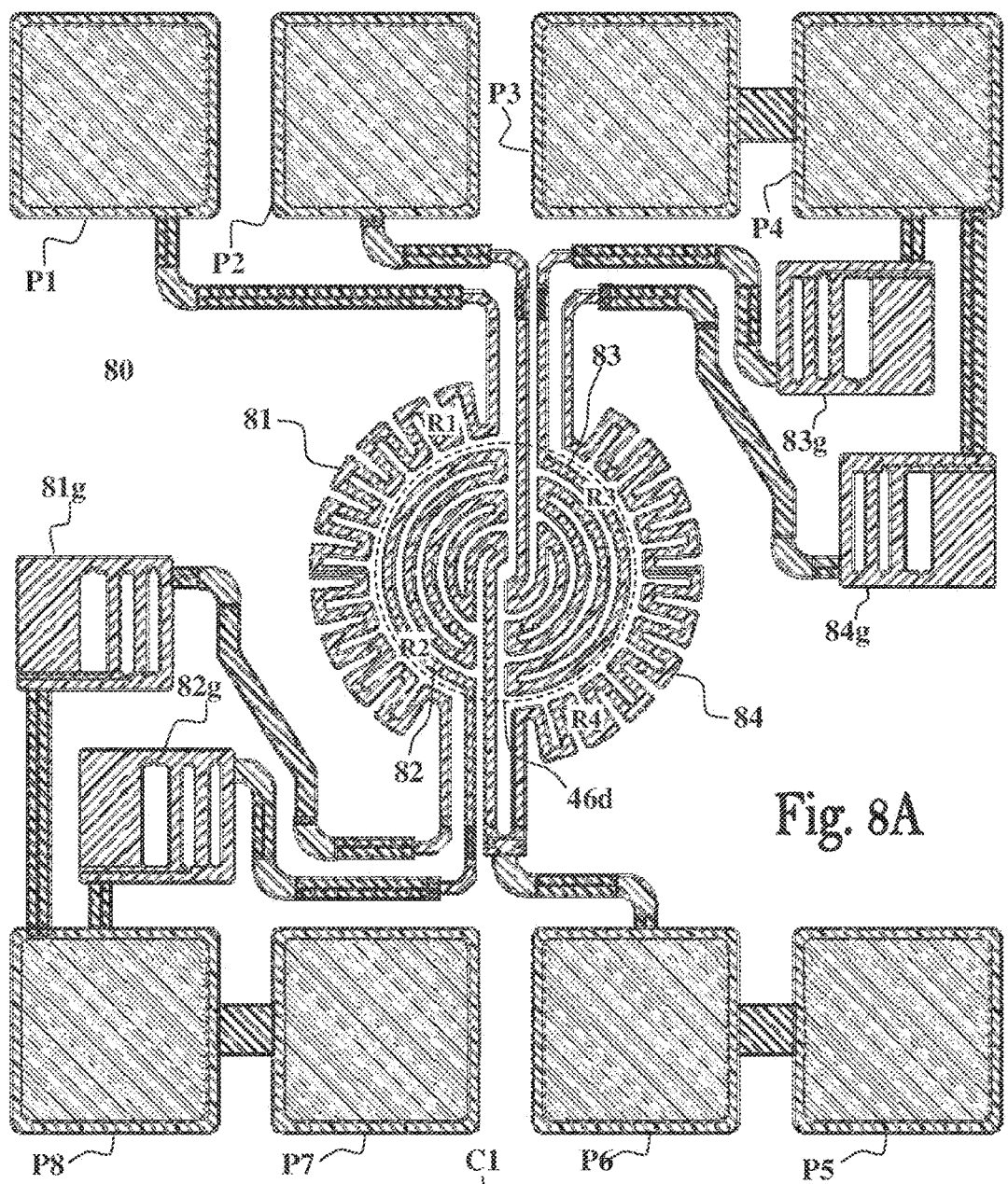

FIG. 8A illustrates another bridge circuitry 80 of some possible embodiments, wherein the transducing elements of all of the resistive elements of the bridge are arranged to form a circular structure, and each resistive element comprises a single electrical resistance adjusting trimming element. This circular structure is achieved by implementing each of the transducing elements of the R2 and R3 resistive elements as half circle structures formed by interfolding arc-shaped serially connected electrically conducting lines, 82 and 83 respectively, such as shown in FIGS. 1, 5 and 7, and implementing each of the transducing elements of the R1 and R4 resistive elements as a wavy pattern of electrically conducting lines, 81 and 84 respectively, extending along an arc accommodating a portion (nearly half) of circular arrangement of the transducing elements of the R2 and R3 resistive elements, respectively i.e., the arc-shaped wavy pattern of R1 accommodates the interfolding pattern of R2, and the arc-shaped wavy pattern of R4 accommodates the interfolding pattern of R3.

In this specific and non-limiting example the wavy patterns 81 and 84 are formed by rectangular periodic wave shapes, to thereby maximize surface area coverage and reduce the size of the sensing device 80. Of course, other wavy patterns (e.g., curved, circular, sinusoidal, rectangular, saw-tooth shaped, or combinations thereof) can be similarly used in the transducing elements of the resistive elements R1 is and R4, instead of, or in addition to, the rectangular wavy patterns 81 and 84. As seen, the arc-shaped rectangular wavy patterns 81 and 84 form a circular structure tightly encircling the circular structure formed by the half circle structures 82 and 83, wherein the wavy pattern 81 of the resistive elements R1 extending adjacent and about the transducing element 82 of the resistive element R2, and the wavy pattern 84 of the resistive elements R4 extending adjacent and about the transducing element 83 of the resistive element R3. Other arrangements of the wavy patterns 81 and 84 can be of course used to construct similar circular structures.

The transducing element 81 (of R1) is electrically connected by one terminal thereof to the contact pad P1, and by its other terminal to the trimming element 81g, which is electrically connected to the contact pad P8. The transducing element 82 (of R2) is electrically connected by one terminal thereof to the contact pad P6, and by its other terminal to the trimming element 82g, which is electrically connected to the contact pad P8, thereby electrically connecting between the R1 and R2 resistive elements. The transducing element 84 (of R4) is electrically connected by one terminal thereof to the trimming element 84g, which is electrically connected to the contact pad P4, and by its other terminal to the contact pad P6, thereby electrically connecting between the R4 and R2 resistive elements. The transducing element 83 (of R3) is electrically connected by one terminal thereof to the contact pad P2, and by its other terminal to the trimming element 83g, which is also electrically connected to the contact pad P4, thereby electrically connecting between the R3 and R4 resistive elements.

Optionally, and in some embodiments preferably, the transducing elements 82 and 83 of the resistive element R1 is and R4, are placed on/in deformable surface areas 46d of sensing device 80, and/or of the object the sensing device 80 is patterned on, or attached to. In this way a Wheatstone bridge configuration can be obtained by electrically connecting between P1 and P2.

Figure 8B:
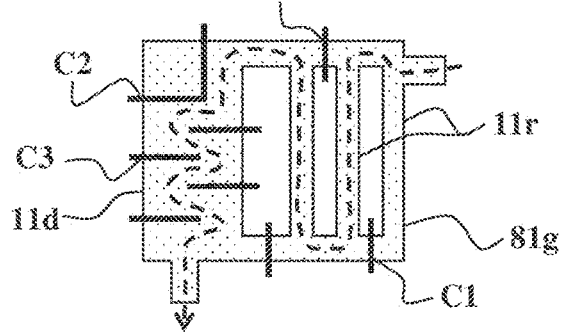

Each of the trimming elements 81g, 82g, 83g and 84g, is configured to permit both digital and analog trimming to adjust the electrical resistance of its respective resistive element. With reference to FIG. 8B, each trimming element comprises an array of grid lines comprising a number of parallel spaced apart grid lines 11r electrically connected in parallel, and at least one conducting bar 11d electrically connected in parallel to the array of grid lines 11r. The electrical resistance of the trimming element can be adjusted by applying one or more cuts C1 to convert electrical parallel connection of two adjacently located grid lines 11r into an electrical serial connection, and/or apply one or more right angled cuts C2, and/or transversely side extending cuts C3 to form constricted electrical conduction sections in the conducting bar 11d. This way a two stage resistance adjustment process can be used, starting in applying one or more cuts C1 until the difference between the desired target resistance and the actual resistance (after applying the cuts C1) becomes smaller than the average electrical resistance of a grid line in the trimming element, or until the difference between the desired target resistance and the actual resistance becomes smaller than the maximum resistance changes achievable using C2 and C3 cuts described below, and then applying one or more cuts C2 and/or C3 until the difference between the desired target resistance and the actual resistance (after applying the cuts C2 and/or C3) becomes negligibly small (i.e., within a predefined tolerable resistance deviation range).

Figure 9:
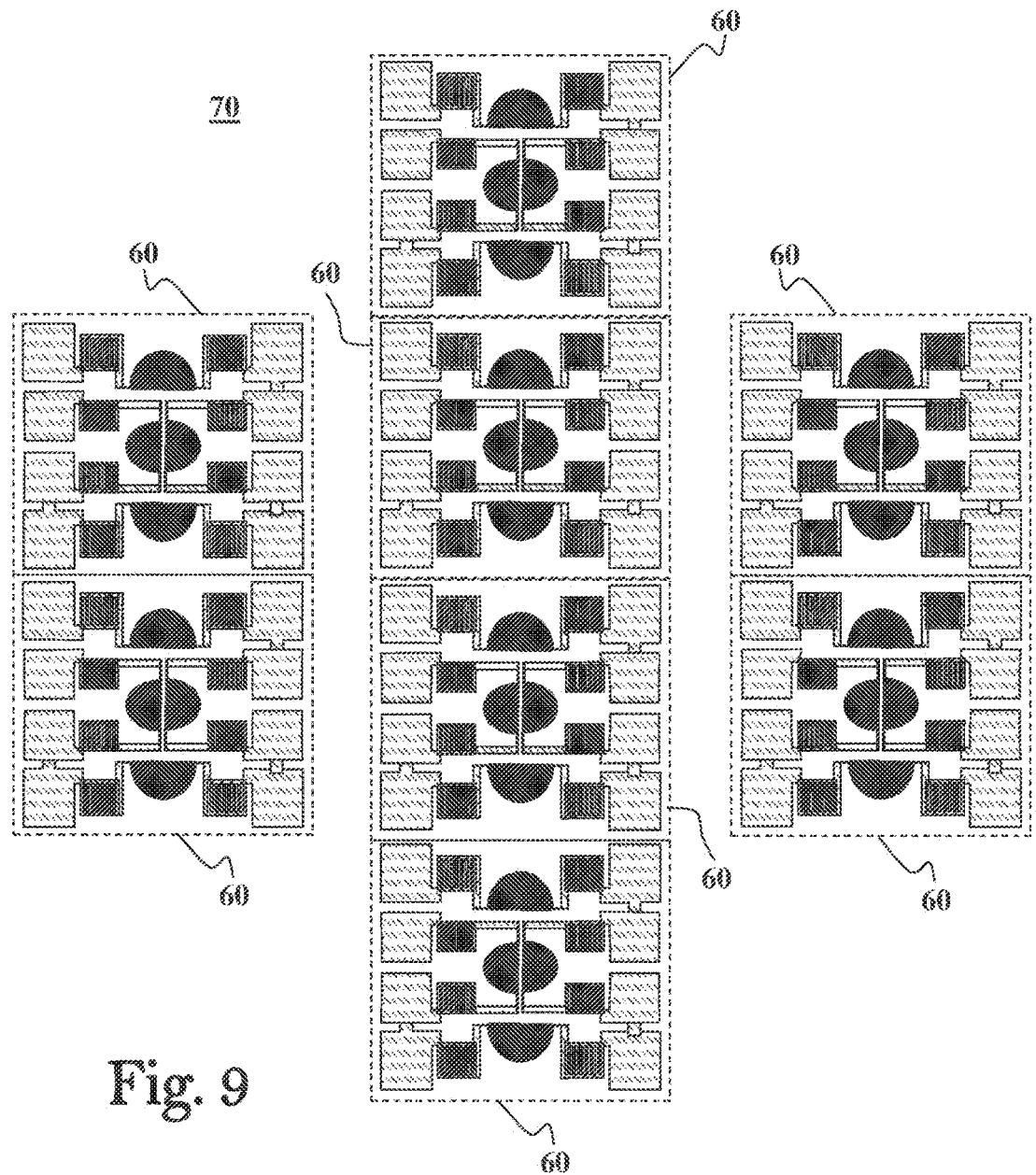
FIG. 9 schematically illustrates production of an array of Wheatstone bridge circuitries according to a possible embodiment.

FIG. 9 schematically illustrates production of an array 70 of Wheatstone bridge circuitries 60, suitable for mass production, according to a possible embodiment. Similarly, the electrical resistances of the resistive elements of each Wheatstone bridge circuitry 60 of the array 70 can be accurately set after patterning the bridge circuitry 60, using the digital and/or analog techniques described hereinabove. The dashed lines in FIG. 9 are cutting lines for separating each bridge circuitry 60 from the array 70.

Figure 10:
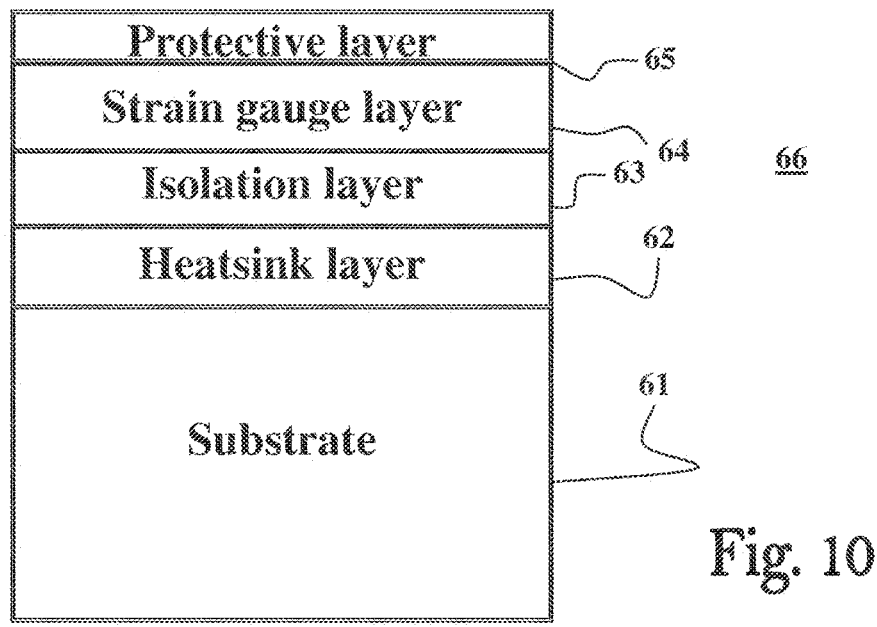
FIG. 10 schematically illustrates a layered structure of a MEM device according to some embodiments.

FIG. 10 schematically illustrates a multilayered structure of a MEM device 66 comprising a strain gauge element according to some possible embodiments. The MEM device 66 comprises a substrate 61 (object or thin film/foil) having an optional heatsink layer 62 applied thereon. The substrate 61 may be manufactured using the material and techniques described in International Patent Publication No. WO 2015/114635, of the same applicant hereof, and the optional heatsink layer 62 can be made from a metallic material applied over the substrate 61 by sputtering, evaporation or lamination, for example.

Optionally, and in some embodiments preferably, heatsink layer 62 comprises a thin isolation/electrically insulating layer 63 applied thereon for electrically insulating it from the strain gauge layer 64 attached/patterned thereon. Particularly, if the heatsink layer 62 is electrically conductive, a thin isolation/electrically insulating layer 63 is applied thereover before attaching/pattering the strain gauge layer 64, otherwise, if the heatsink layer 62 is only a heat conducive layer (e.g., made of Aluminum oxide) the isolation/electrically insulating layer 63 is not needed and can be avoided. In some embodiment the insulating layer 63 is used as the substrate on which the different components of the strain gauge element are formed/patterned.

A protective layer 65 can be applied on top of the strain gauge layer 64 after (or before) setting the electrical resistances of its resistive components using the analog and/or digital trimming techniques described hereinabove. The protective layer 65 is used to protect the strain gauge layer 64 from environmental/external events/conditions (e.g., prevent physical contact) and for guaranteeing that the accuracy of the resistive elements of the strain gauge layer 64, set by the digital and/or the analog trimming techniques described hereinabove, is maintained.

The optional heat sink layer 62 can be made from one or more heat conducting materials (e.g., Copper, Aluminum, NiCr, Gold, Nickel, Cr or their alloys) having a predefined thickness (e.g., 5 nm to 75 μm) suitable for sinking the heat produced by the strain gauge layer 64, to thereby improve the heatsink capacity of the strain gauge without effecting the deformation of the device 66. Heavy sections of high-thermal-conductivity metals, such as copper or aluminum, can be used as excellent heat sinks for the heatsink layer 62. The dimension and pattern of the heat sink layer 62 is designed to maximize the heat dissipation and uniformity and could extend also under the contact pads (14).

Figure 11A:
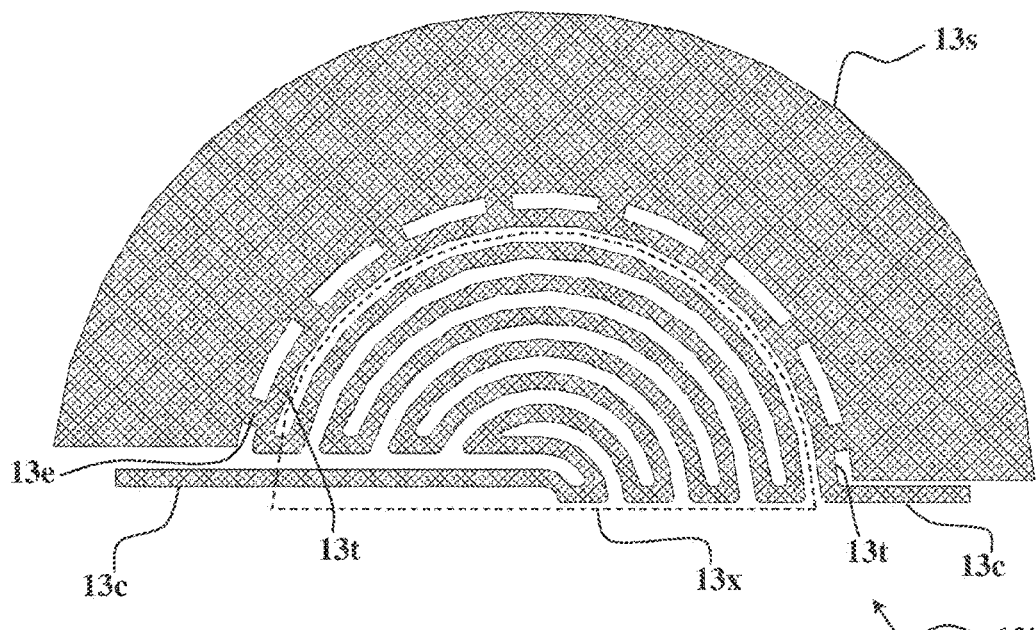
Figure 11B:
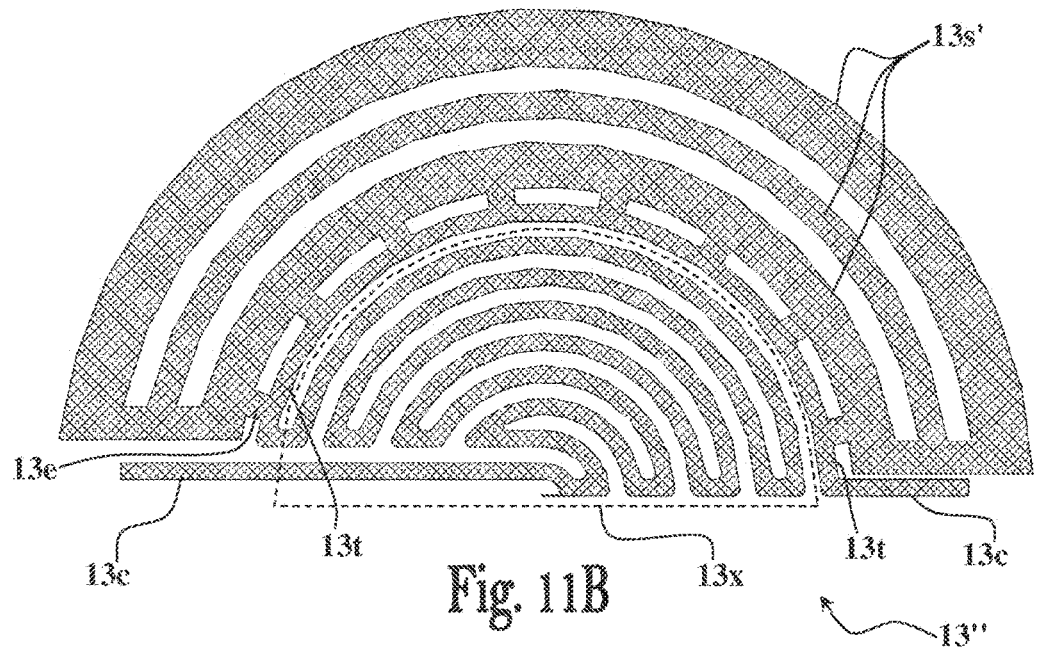
Figure 11C:
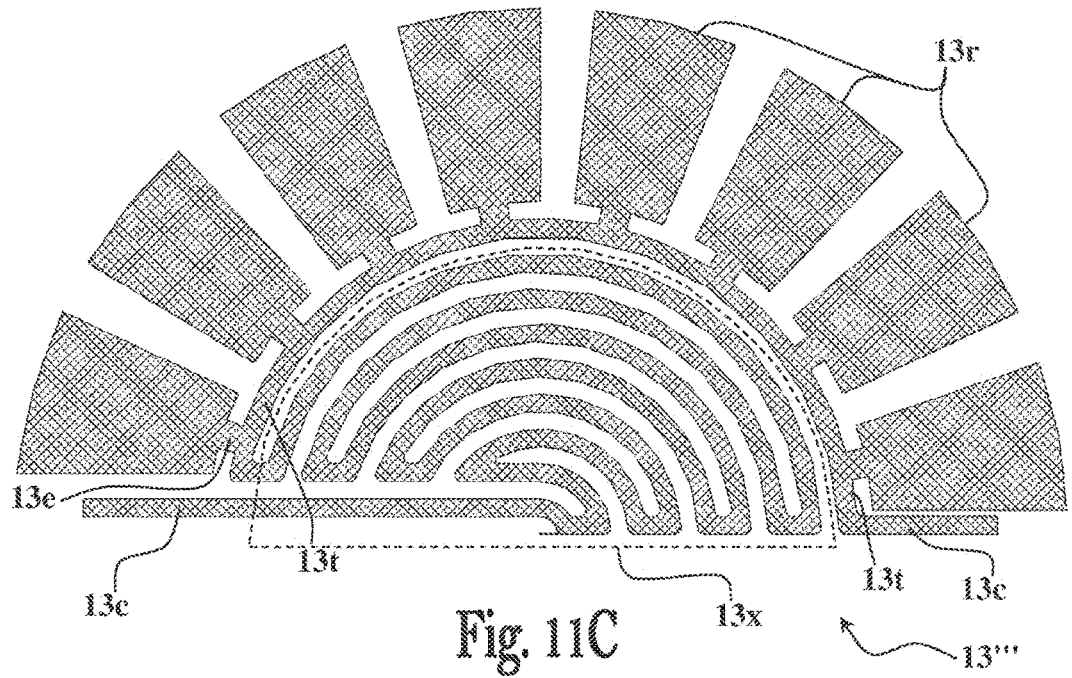

FIGS. 11A to 11C schematically illustrate different configurations of transducing elements having thermally coupled heat sink bodies/ribs configured to improve their heat dissipation properties. The heat-sink bodies/ribs can be connected directly, or via a coupling tab, to their transducer element. Thereby increasing its surface area and improving its heatsink capacity. The heatsink can have different shapes and its geometrical dimensions/size can be adapted to minimize influence of the deformations (if it is placed on the deformable region).

FIG. 11A shows a transducing element 13' having the half-circle arc-shaped interfolding conducting lines configuration 13x, as shown in FIGS. 1, 5, 7 and 8A, and a single arc-shaped heat sink rib 13s, having a width substantially wider than the width of the conducting lines of the transducer element, thermally coupled to it, and surrounding a majority of the circumference of the transducing element 13'. In this embodiment the heat sink rib 13s is physically connected to the outermost arc-shaped conducting line 13t of the transducing element 13' by a plurality of spaced apart and circumferentially distributed small coupling tabs 13e. This transducer element structure 13' can be prepared using the same electrical conducting material to form both the conducting lines of the transducer element and the heat sink rib 13s. Thus, the same metallic materials indicated hereinabove with reference to the strain gauge element 10 of FIG. 1 can be used to prepare the transducer element 13'.

FIG. 11B shows a transducing element 13" having a plurality of arc-shaped heat sink ribs 13s' surrounding a majority of the circumference of the transducing element and thermally coupled to the transducer element. The arc-shaped heat sink ribs 13s' are connected to each other at their ends to form a rainbow structure connected to the outermost arc-shaped conducting line 13t of the transducer element by a plurality of spaced apart and circumferentially distributed small coupling tabs 13e. The transducer element structure 13" and its heat sink ribs 13s' can be prepared using the same electrical conducting materials described above.

FIG. 11C shows a transducing element 13'" having a plurality of thermally coupled heat sink bodies 13r circumferentially distributed along a major circumference of the transducing element. Each heat sink body 13r is attached to the outermost arc-shaped conducting line 13t of the transducing element by a respective coupling tab 13e, thereby forming a segmented arc-shaped heat sink body. The heat sink bodies 13r can each have a trapezoid shape having its minor base facing the outmost arc-shaped conducting line 13t, to thereby maximize the surface area covered by them. It is however clear that any other shape (e.g., circular/oval, rectangular, triangular, or any suitable polygonal shape, and combinations thereof) of the heat sink bodies 13r can be similarly used. The transducer element structure 13'" and its heat sink bodies 13r can be prepared using the same electrical conducting materials described above.

In this specific and non-limiting examples the transducing elements 13', 13" and 13'", all have the same half-circle arc-shaped interfolding conducting lines configuration, as shown in FIGS. 1, 5 and 7. It is however clear that the different heat sink structures described and illustrated herein can be similarly used in any other conducting lines configuration of the transducing elements.

Figure 12:
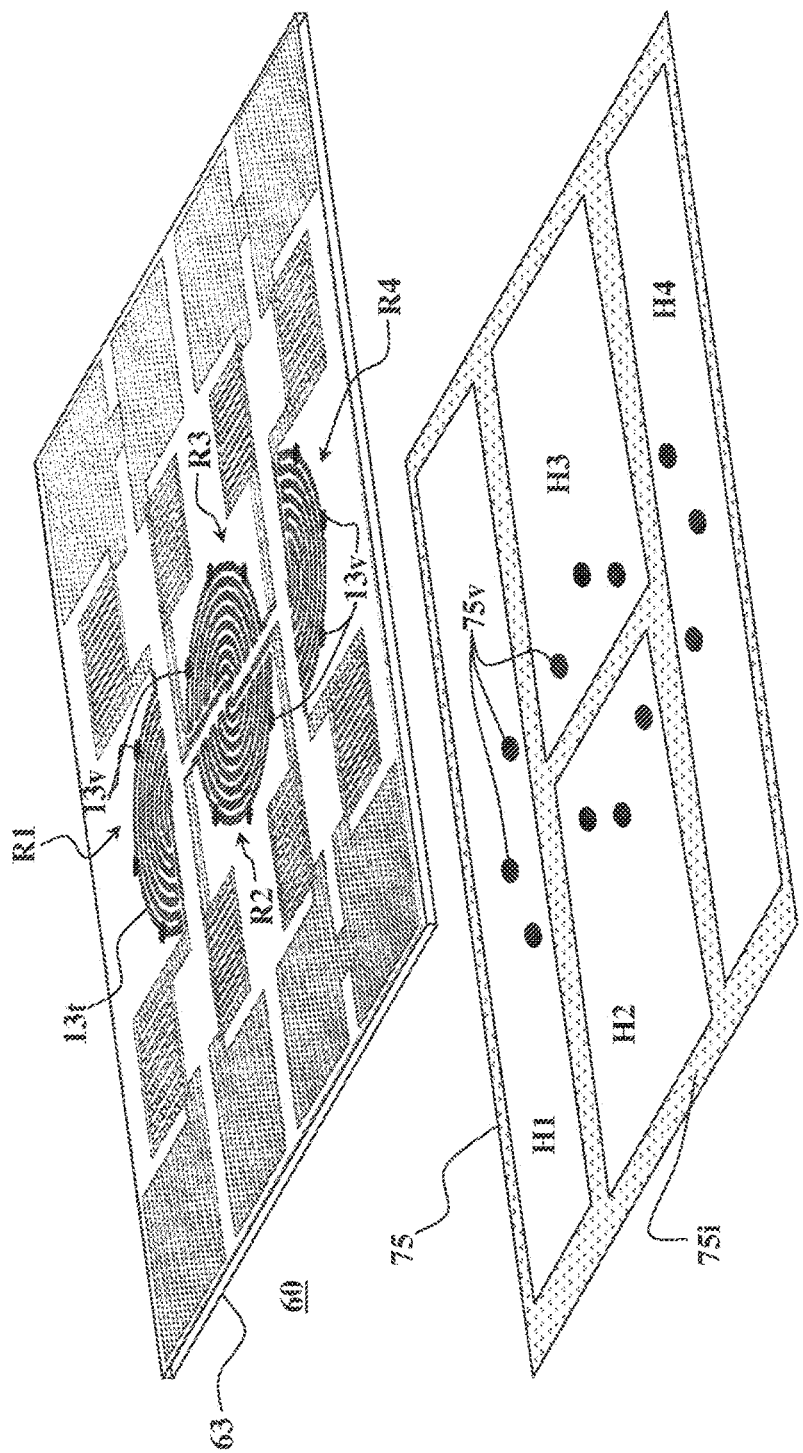
FIG. 12 schematically illustrate a sensing device having a heat sink layer comprising a respective heat sink region thermally coupled to each strain gauge element through one or more vias.

FIG. 12 schematically illustrate a sensing device 60 having a heat sink layer 75 thermally and electrically coupled to its transducer elements through one or more vias 13v. In order to prevent electrical short circuits the electrical and resistive components (i.e., transducing elements trimming grids, contact pads, conduction lines and bars) are all patterned on an electrically insulating layer 63 (e.g., thin film or foil). In this specific and non-limiting example one or more vias 13v are formed along, or adjacently contacting, the outermost arc-shaped conducting line 13t of each transducer element. However, in possible embodiments such vias 13v can be formed in other arc-shaped conducting lines of the transducer elements.

The heat sink layer 75 comprises an electrically insulated sheet 75i having one or more flat and thin heat sink regions H1, H2, H3 and H4 (collectively referred to herein as heat sink regions H) electrically and thermally coupled to at least one transducing element of the sensing device 60 through one or more vias 13v. In this specific and non-limiting example the transducer element of each resistive element Ri (where $1 \leq i \leq 4$ is an integer) is electrically and thermally coupled to a respective heat sink region Hi through three vias 13v formed in the outermost arc 13t of the transducing element Ri. But of course any other number of vias 13v can be similarly used.

The vias 13v can be formed as pass-through bore drilled in the electrically insulating layer 63 (also referred to herein as the strain gauge layer) carrying the strain gauge elements, filled with a suitable electrically and thermally conducting material to contact the respective heat sink region Hi located therebeneath on/in the electrically insulated sheet 75i of the heat sink layer 75, at contact points 75v. As illustrated, each heat sink region Hi can be implemented by a rectangular piece of electrically and thermally conducting material (e.g., any of the metal substances indicated hereinabove) configured to substantially cover, and substantially aligned with, the surface area of the respective strain gauge element to which it is coupled. Of course any other shape of the heat sink regions Hi can be similarly used.

In some embodiments the heat sink regions Hi of the sensing device 60 are also used as an electrical ground of the device. Additionally, or alternatively, the heat sink regions Hi are used in possible embodiments as antenna(s) for wirelessly communicating signals/data with the sensing device 60. In some embodiment the strain gauge elements of the sensing device 60 are configured to comprise heat sinking bodies, such as described with reference to FIGS. 11A, 11B and/or 11C.

In some embodiments wherein the strain gauge elements, and/or the sensing device implemented by them, comprises and electrically conducting heat sinking layer/bodies, such as 46h in FIG. 6, 62 in FIG. 10, and Hi in FIG. 12, the electrically conducting heat sinking layer/bodies can be further used to provide electrical shielding against magnetic and/or electromagnetic interferences (i.e., Faraday shield).

Optionally, the heat sink layer 75 comprises additional flat thin heat sink regions H thermally and electrically coupled/connected to one or more, or all of, the trimming grids, through respective vias. In some embodiments the transducing elements, and/or the trimming grids, are thermally and electrically coupled/connected by conducting lines to heat sink elements/regions (not shown) formed on the strain gauge layer 63 to maximize the surface area thereby occupied. Optionally, and in some embodiments preferably, the heat sink elements H/Hi are formed on the underside of the strain gauge layer 63 and thermally and electrically coupled/connected to the transducing elements, and/or the trimming grids, by vias 13v. Optionally, the substrate layer (61 in FIG. 10) is used to implement the isolation layer.

The vias 13v can be formed by electroless or electroplating, or a combination thereof. The heat sink regions can be formed by sputtering, evaporation, lamination or electroless or electroplating, or a combination thereof followed by lithography processes (e.g., wet etching, liftoff). After attaching the strain gauge layer 63 to the heat sink layer 75 the vias 13v are filled with one or more materials having good thermal and electrical conductivity (e.g., Copper, Aluminum).

Figure 13A:
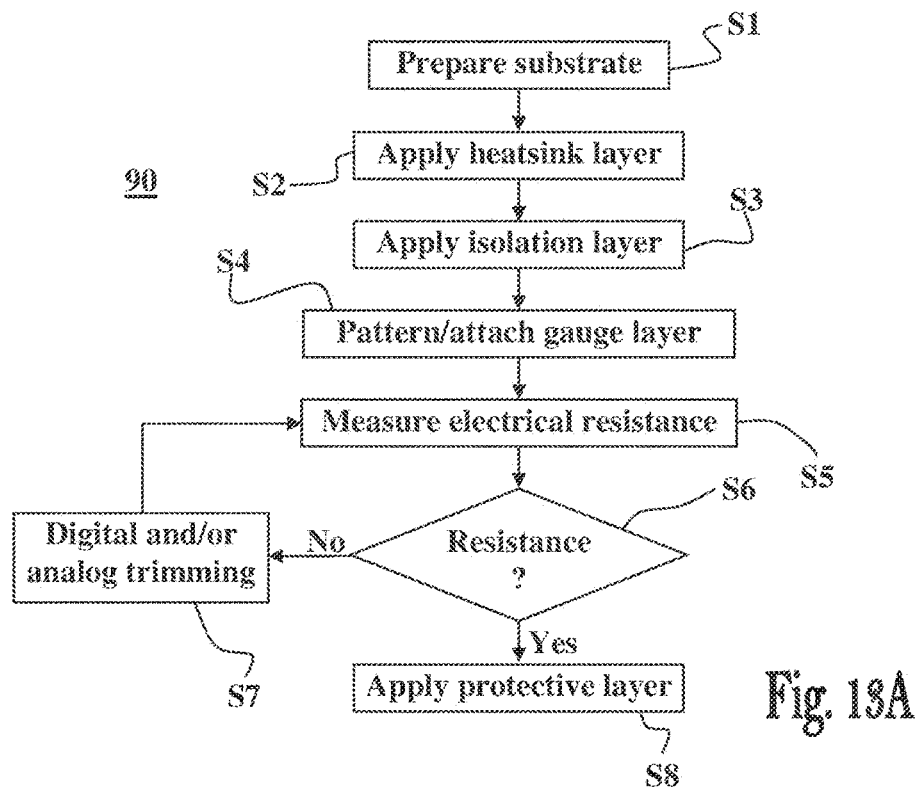
FIGS. 13A and 13B show flow charts schematically illustrating a process of manufacturing a strain gauge element, and calibrating it, according to some possible embodiments.

FIG. 13A is a flow chart schematically illustrating a fabrication process 90 of a MEM device (66) according to some possible embodiments. In step S1 the substrate (61) of the MEM device is prepared, in step S2 the optional heatsink layer (62) is applied (e.g., by sputtering, evaporation, adhesion, welding, lamination, or suchlike) over at least one face or region of the substrate (61), and in step S3 the isolation layer (63) is applied (e.g., by evaporation, lithography, spinning, spraying, lamination or suchlike) at least over the heatsink layer (62) for electrically insulating it from electrical components of the device. The application of the isolation layer of step S3 may be optional in certain cases wherein the heatsink layer (62) is made from electrically non-conducting materials, or if the substrate is made from electrically non-conducting materials. Namely, the electrical/resistive components (i.e., the strain gauge layer) can be formed directly on the heat sink layer, when the heat sink layer is made from an electrically insulating material.

The strain gauge layer (64) is applied in step S4 (e.g., by sputtering, evaporation, lamination, lithography, liftoff, wet-etching or suchlike) over the isolation layer (63, if electric isolation is required), or over the heatsink layer (62, if there is no need for electric isolation). In step S5 the electrical resistances of the strain gauge elements in the strain gauge layer (64) are measured, and if it is determined in step S6 that the electrical resistance needs to be adjusted, in step S7 digital and/or analog trimming is applied to the strain gauge layer (64), as described hereinabove. The measurements of step S5 and digital and/or analog trimming of step S7 can be repeated a number of times until it is determined in step S6 that the electrical resistances of the strain gauge elements in the gauge layer (64) are within acceptable values to obtain a desired sensitivity.

Optionally, and in some embodiments preferably, the electrical resistances of the strain gauge device is adjusted in step S5-S7 by measuring the voltage over the strain gauge elements and applying the digital and/or analog trimming until the voltage level measured over each strain gauge element substantially equals to half of the input voltage level supplied to the bridge circuitry, and/or until the differential voltage outputted by the bridge circuitry is substantially zeroed. Alternatively, or additionally, the electrical current through each branch of the bridge circuitry can be measured to determine whether further trimming is required. In some embodiment the trimming is carried out in a first stage to set the resistance of each strain gage element to a target value with 1% error, and in a second stage the trimming is carried out until the differential voltage outputted by the bridge circuitry is substantially zeroed.

After accurately setting the electrical resistances of all the strain gauge elements in the gauge layer (64), in step S8 the protective layer (65) is applied over the strain gauge layer. In some embodiments the protective layer (65) is deposited before the trimming, such that the trimming cuts also need to cut through the protective layer i.e., step S8 is performed after step S4.

Figure 13B:
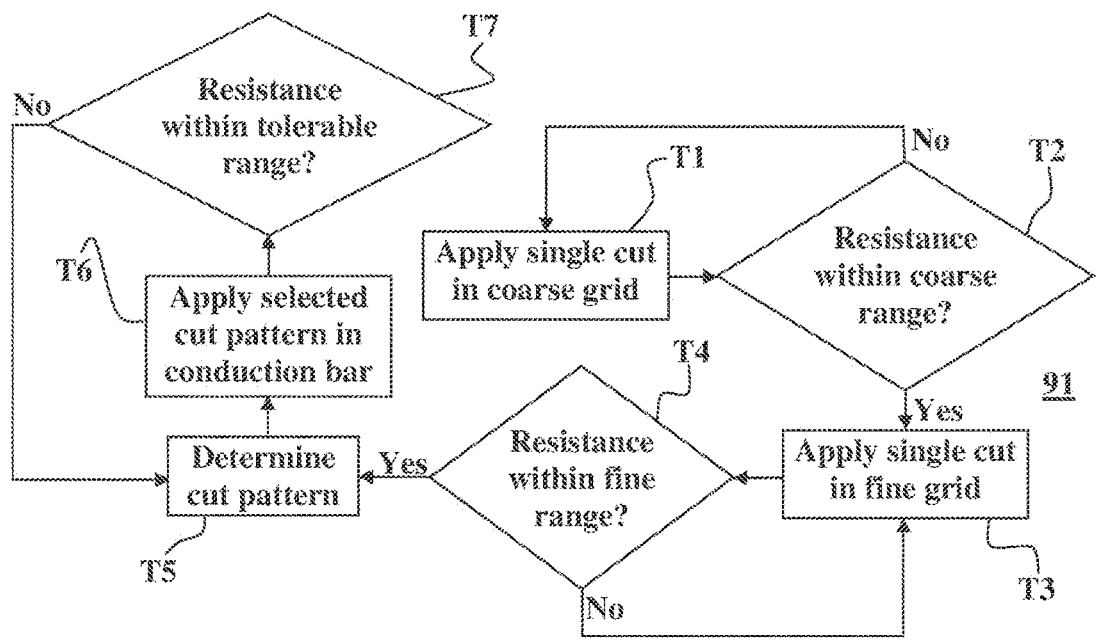

FIG. 13B is a flowchart schematically illustrating a calibration process 91 according to some possible embodiments, wherein the calibration is performed in few stages. In steps T1 and T2 digital trimming of the coarse trimming grid is performed until the difference between the measured resistance of each strain gauge element and the desired target resistance is smaller than an average resistance of a grid line in the coarse trimming grid, or the difference is lower than the maximum resistance change achievable by the fine trimming grid. Next, in steps T3 and T4 digital trimming of the fine trimming grid is performed until the difference between the measured resistance of each strain gauge element and the desired target resistance is smaller than an average resistance of a grid line in the fine trimming grid. Thereafter, in steps T5 to T7 suitable cut patterns are determined and applied to the respective conduction bars until the difference between the measured resistance of each strain gauge element and the desired target resistance is negligibly small (i.e., within a tolerable range), and/or until a differential voltage outputted by the bridge circuitry is substantially zeroed.

The techniques disclosed herein can be used for fabricating strain gauge elements having electrical resistances in the range of 1KΩ to 10MΩ. These strain gauge configurations thus permit using substantially high excitation voltages, independent of the material of the substrate on which they are attached/patterned. In addition, these strain gauge configurations exhibit low power consumption, they can be efficiently powered by a low voltage battery and particularly useful in applications wherein low power consumption is crucial.

As described and illustrated herein, the strain gauge fabrication techniques disclosed herein can be used to directly fabricate Wheatstone bridge circuitries in mass production processes. The strain gauge configurations disclosed can be used to measure surface strains and/or deformations, which can be used to measure fluid/gas pressure and/or flow rate of a substance, and in possible embodiments of acoustic pressure (i.e., force of sound on a surface area e.g., to implement a microphone).

Terms such as top, bottom, front, back, right, and left and similar adjectives in relation to orientation of the strain gauge elements and their components refer to the manner in which the illustrations are positioned on the paper, not as any limitation to the orientations in which the apparatus can be used in actual applications. It should also be understood that throughout this disclosure, where a process or method is shown or described, the steps of the method may be performed in any order or simultaneously, unless it is clear from the context that one step depends on another being performed first.

As described hereinabove and shown in the associated figured, the present application provides techniques for constructing thin strain gauge elements having relatively high electrical resistances that can be accurately set during the fabrication process. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A strain gauge element comprising a substrate, said substrate comprising:
    at least one transducing element configured to change at least one electrical property thereof in response to deformations in said substrate;
    one or more trimming grids electrically connected to said at least one transducing element and configured to accurately set electrical resistance of said strain gauge element by setting lengths of their conduction paths without changing a conduction path of said at least one transducing element, said one or more trimming grids being spaced apart from said at least one transducing element to thereby substantially prevent transfer of heat therebetween; and
    at least one heat sink element thermally coupled to dissipate heat from at least said at least one transducing element.

2. The strain gauge element of claim 1, wherein the at least one heat sink element comprises a layer made of an electrically insulating material having high thermal conductivity properties, and wherein electrically conducting elements of the strain gauge element are patterned on or in said electrically insulating and high thermal conductivity layer.

3. The strain gauge element of claim 1, wherein the at least one heat sink element comprises one or more heat sinking patterns electrically and thermally coupled to the at least one transducer element.

4. The strain gauge element of claim 1, wherein the at least one heat sink element comprises a heat sink layer having one or more heat sink regions made of an electrically conducting material having high thermal conductivity properties, and wherein the electrically conducting elements of the strain gauge element are patterned on or in an electrically insulating layer located above said heat sink layer.

5. The strain gauge element of claim 4, wherein at least one of the one or more heat sink regions of the at least one heat sink element is electrically and thermally coupled to the at least one transducing element through one or more vias passing through the electrically insulating layer.

6. The strain gauge element of claim 1, wherein at least one of the one or more trimming grids comprises an array of parallel grid lines electrically connected in parallel by trimmable conduction paths.

7. The strain gauge element of claim 1, wherein the substrate comprises at least one deformable region, and wherein the at least one transducing element is located on, or in, said at least one deformable region.

8. The strain gauge element of claim 1, comprising one or more electrically conducting regions configured to permit altering the electrical resistance of the strain gauge element by application of vertical and/or lateral cuts therein, and wherein at least one of the trimming grids is electrically connected to the transducer element by one or more of said conducting regions.

9. The strain gauge element of claim 1, comprising a fine trimming grid configured to introduce small changes in the electrical resistance of the strain gauge element, and a coarse trimming grid configured to introduce large changes in the electrical resistance of the strain gauge element, said fine and coarse trimming grids electrically connected in series to the at least one transducing element.

10. The strain gauge element of claim 8, wherein at least one of the fine trimming grid and the coarse trimming grid is electrically connected to the transducer element via at least one of the one or more conducting regions.

11. The strain gauge element of claim 1, comprising at least one protective layer configured to substantially cover the electrical components of the strain gauge element.

12. The strain gauge element of claim 1, wherein the at least one heat sink element is utilized as an electrical ground or antenna.

13. The strain gauge element of claim 1 wherein the substrate is a thin deformable sheet.

14. A strain gauge element comprising a substrate, at least one transducing element configured to change at least one electrical property thereof in response to deformations in said substrate, one or more trimming grids electrically connected to said at least one transducing element and configured and operable to accurately set electrical resistance of said strain gauge element by setting length of a conduction path thereof, and at least one heat sink element thermally coupled to at least one of said at least one transducing element and said one or more trimming grids and configured to dissipate heat developed therein, wherein
the substrate comprises at least one deformable region,
the at least one transducing element is located on, or in, said at least one deformable region, and
the substrate comprises at least one lumen in fluid communication with the deformable region for applying fluid pressure thereover.

15. A sensing device comprising at least four strain gauge devices according to claim 1, arranged on the same substrate and electrically connected to each other to form a bridge circuitry.

16. A method of fabricating a strain gauge element, the method comprising:
preparing a substrate;
providing said substrate at least one heat sink element;
forming on, or in, said substrate at least one transducer structure and one or more trimming grids electrically connected thereto and thermally coupled to said at least one heat sink element; and
applying one or more cuts to said one or more trimming grids to set a length of a conduction path of said one or more trimming grids to thereby accurately set electrical resistance of said strain gauge element.

17. The method of claim 16, wherein the forming comprises electrically and thermally coupling the at least one heat sink element to the at least one transducer structure.

18. The method of claim 16, wherein the at least one heat sink element comprises a layer made of an electrically insulating material, and wherein the forming comprises forming the at least one transducer structure and one or more trimming grids on, or in, said electrically insulating layer.

19. The method of claim 16, wherein the forming comprises forming one or more conducting regions electrically connecting between at least one of the one or more trimming grids and the at least one transducer structure, and wherein the method comprising applying one or more cuts in the one or more conducting regions to alter the electrical resistance of the strain gauge element.

20. The method of claim 16, comprising applying a protective layer over at least the transducer structure and the trimming grids after applying the one or more cuts.

21. The method of claim 16, wherein the preparing of the substrate comprises forming at least one insolation layer configured to electrically insulate the at least one heat sink element from the formed components.

22. The method of claim 21, wherein the at least one heat sink element is made from an electrically conducting material, and wherein the method comprises forming one or more vias in said at least one insolation layer to electrically and thermally couple between the at least one heat sink element and the at least one transducer structure.

* * * * *